(12) United States Patent
Feng et al.

(10) Patent No.: US 7,206,423 B1
(45) Date of Patent: Apr. 17, 2007

(54) INTRABODY COMMUNICATION FOR A HEARING AID

(75) Inventors: Albert S. Feng, Champaign, IL (US); Douglas Jones, Champaign, IL (US); Bruce C. Wheeler, Champaign, IL (US); Robert C. Bilger, Champaign, IL (US); Charissa R. Lansing, Champaign, IL (US); William D. O'Brien, Champaign, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 0 days.

(21) Appl. No.: 09/568,435

(22) Filed: May 10, 2000

(51) Int. Cl.
*H04R 25/00* (2006.01)

(52) U.S. Cl. ............... 381/312; 381/315; 455/100

(58) Field of Classification Search ............ 381/326, 381/380, 328, 314, 313, 312, 315, 323, 330–331; 687/57, 25; 455/40–41, 95, 100, 106; 340/333; 379/55.1; 341/33
See application file for complete search history.

(56) References Cited

U.S. PATENT DOCUMENTS

| | | |
|---|---|---|
| 3,123,678 A | 3/1964 | Prentiss et al. |
| 4,207,441 A | 6/1980 | Ricard et al. |
| 4,304,235 A | 12/1981 | Kaufman |
| 4,334,740 A | 6/1982 | Wray |
| 4,536,887 A | 8/1985 | Kaneda et al. |
| 4,559,642 A | 12/1985 | Miyaji et al. |
| 4,858,612 A | 8/1989 | Stocklin |
| 4,982,434 A | 1/1991 | Lenhardt et al. |
| 4,988,981 A | 1/1991 | Zimmerman et al. |
| 5,012,520 A | 4/1991 | Steeger |
| 5,047,994 A | 9/1991 | Lenhardt et al. |
| 5,245,556 A | 9/1993 | Morgan et al. |
| 5,259,032 A | 11/1993 | Perkins et al. |
| 5,285,499 A | 2/1994 | Shannon et al. |
| 5,321,332 A | 6/1994 | Toda |
| 5,383,915 A | 1/1995 | Adams |

(Continued)

FOREIGN PATENT DOCUMENTS

DE 195 41 648 C2 10/2000

(Continued)

OTHER PUBLICATIONS

T. Starner et al., Augmented Reality Through Wearable Computing, MIT Media Lab Perceptual Computing Section Technical Report No. 397, 1997, MIT Media Lab, Cambridge, MA.

(Continued)

*Primary Examiner*—Suhan Ni
(74) *Attorney, Agent, or Firm*—Krieg DeVault LLP; L. Scott Paynter

(57) ABSTRACT

Disclosed is a hearing aid that includes a first component operable to receive an input and a second component operable to provide an output to at least one ear of a user of the hearing aid. The first component and the second component are electrically coupled together by a closed electrical circuit including at least one electrical conduction pathway formed by skin of the user between the first component and the second component. An electrical signal is transmitted from the first component to the second component with the closed electrical circuit. Communication between the first and second components can be one-way or two-way.

40 Claims, 15 Drawing Sheets

U.S. PATENT DOCUMENTS

| | | | |
|---|---|---|---|
| 5,454,838 A | | 10/1995 | Vallana et al. |
| 5,479,522 A | * | 12/1995 | Lindemann et al. ........ 381/315 |
| 5,507,781 A | | 4/1996 | Kroll et al. |
| 5,550,923 A | | 8/1996 | Hotvet |
| 5,663,727 A | | 9/1997 | Vokac |
| 5,694,474 A | | 12/1997 | Ngo et al. .................... 381/66 |
| 5,715,319 A | | 2/1998 | Chu |
| 5,721,783 A | * | 2/1998 | Anderson |
| 5,737,430 A | | 4/1998 | Widrow |
| 5,793,875 A | | 8/1998 | Lehr et al. |
| 5,833,603 A | | 11/1998 | Kovacs et al. |
| 5,878,147 A | * | 3/1999 | Killion et al. |
| 5,889,870 A | | 3/1999 | Norris |
| 5,914,701 A | | 6/1999 | Gersheneld et al. |
| 5,991,419 A | * | 11/1999 | Brander ...................... 381/312 |
| 6,009,183 A | | 12/1999 | Taenzer et al. |
| 6,010,532 A | | 1/2000 | Kroll et al. |
| 6,068,589 A | | 5/2000 | Neukermans |
| 6,076,016 A | * | 6/2000 | Feierbach .................... 607/32 |
| 6,084,975 A | * | 7/2000 | Perkins ....................... 381/326 |
| 6,104,822 A | | 8/2000 | Melanson et al. .......... 381/320 |
| 6,118,882 A | | 9/2000 | Haynes |
| 6,137,889 A | | 10/2000 | Shennib et al. |
| 6,141,591 A | | 10/2000 | Lenarz et al. |
| 6,161,046 A | | 12/2000 | Maniglia et al. |
| 6,167,312 A | | 12/2000 | Goedeke |
| 6,173,062 B1 | | 1/2001 | Dibachi et al. |
| 6,217,508 B1 | | 4/2001 | Ball et al. |
| 6,222,927 B1 | | 4/2001 | Feng et al. ................. 381/94.2 |
| 6,223,018 B1 | | 4/2001 | Fukumoto et al. |
| 6,229,900 B1 | | 5/2001 | Leenen |
| 6,261,224 B1 | | 7/2001 | Adams et al. |
| 6,275,596 B1 | | 8/2001 | Fretz et al. |
| 6,283,915 B1 | | 9/2001 | Aceti et al. |
| 6,307,945 B1 | | 10/2001 | Hall |
| 6,327,370 B1 | | 12/2001 | Killion et al. |
| 6,332,028 B1 | | 12/2001 | Marash |
| 6,342,035 B1 | * | 1/2002 | Kroll et al. |
| 6,385,323 B1 | | 5/2002 | Zoels |
| 6,389,142 B1 | * | 5/2002 | Hagen et al. ................ 381/313 |
| 6,390,971 B1 | | 5/2002 | Adams et al. |
| 6,397,186 B1 | | 5/2002 | Bush et al. |
| 6,421,448 B1 | | 7/2002 | Arndt et al. |
| 6,424,721 B1 | | 7/2002 | Hohn |
| 6,754,472 B1 | * | 6/2004 | Williams et al. ............ 455/100 |
| 6,861,944 B1 | | 3/2005 | Hoepelman |
| 2001/0051776 A1 | | 12/2001 | Lenhardt |

FOREIGN PATENT DOCUMENTS

| | | |
|---|---|---|
| EP | 0 802 699 | 10/1997 |
| EP | 0 824 889 A1 | 2/1998 |
| EP | 0 843 425 A2 | 5/1998 |
| WO | WO 98/26629 | 6/1998 |
| WO | WO 98/56459 | 12/1998 |
| WO | WO 00/30404 | 5/2000 |

OTHER PUBLICATIONS

E. Post et al., Intrabody Buses for Data and Power, Physics and Media, MIT Media Laboratory, Cambridge, MA, at least as early as 1997.

T.G. Zimmerman, Personal Area Networks: Near-field intrabody communication, IBM Systems Journal, 1996, MIT Media Lab, vol. 35, No. 3 & 4, pp. 609-617.

T. Zimmerman, Personal Area Networks (PAN): A Technology Demonstration by IBM Research, IBM Systems Journal, 1996, MIT Media Lab, vol. 35, No. 3 & 4.

J. Paradiso et al., Musical Applications of Electric Field Sensing, Physics and Media Group—MIT Media Laboratory, Apr. 1996, Computer Music Journal.

T.G. Zimmerman et al., Applying Electric Field Sensing to Human-Computer Interfaces, MIT Media Lab—Physics and Media Group, IEEE Sig, May 1995.

* cited by examiner

INTRABODY COMMUNICATION FOR A HEARING AID

CROSS-REFERENCE TO RELATED APPLICATIONS

The present application is related to U.S. patent application Ser. No. 08/666,757 filed 19 Jun. 1996, U.S. patent application Ser. No. 09/193,058 filed 16 Nov. 1998, and the U.S. Patent Application entitled "Interference Suppression Techniques" and filed on even date herewith, all of which are hereby incorporated by reference.

BACKGROUND OF THE INVENTION

The present invention relates to acoustic signal processing, and more particularly, but not exclusively, relates to communication between components of a hearing aid.

The difficulty of extracting a desired sound in the presence of interfering sound sources is a long-standing problem. Especially troublesome is the separation of desired sound from unwanted sound with hearing aids. Generally, such devices do not permit selective amplification of a desired sound when contaminated by noise from a nearby source—particularly when the noise is more intense. This problem is even more severe when the desired sound emanates from a selected speaker and the nearby noise is produced by several talkers.

One technique to address such problems is a hearing aid system that includes two or more components worn by a user in different locations. During operation, it is generally desirable that one or more communication links be established between these components using wireless interconnect technology. Interconnecting these components by wires or cables to facilitate communication is greatly undesirable. Furthermore, communication through the transmission of electromagnetic signals through the air also has certain drawbacks, such as the potential for interference by stray signals and the difficulty of incorporating the necessary transmission and reception circuits into a device of a size that can be comfortably worn by the user.

Thus, there continues to be a demand for further contributions in this area of technology.

SUMMARY OF THE INVENTION

One form of the present invention includes a unique hearing aid system. Other forms include unique devices and methods for processing and communicating signals for a hearing aid. Further forms, embodiments, objects, features, aspects, benefits, and advantages of the present invention shall become apparent from the detailed drawings and descriptions provided herein.

BRIEF DESCRIPTION OF THE DRAWINGS

In the following figures, like reference numerals represent like features. In some cases, the figures or selected features thereof are not drawn to scale to enhance clarity.

DESCRIPTION OF SELECTED EMBODIMENTS

Figure 1:
FIG. 1 is a diagrammatic view of a hearing aid system as worn by a user.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates hearing aid system 20 of one embodiment of the present invention worn by hearing aid user 21. As used herein, "hearing aid" or "hearing aid system" refers broadly to any apparatus used to enhance normal hearing or impaired hearing of an individual. System 20 includes two acoustic input/output (I/O) components 30a and 30b, and processing component 30c (collectively designated modules 30). Modules 30 are each at least partially in contact with skin 26 of user 21 and are spaced apart from one another.

Acoustic I/O components 30a, 30b are each disposed in a corresponding passage of the ears E1, E2 of user 21, and include acoustic sensors 22a, 22b opposing earphones 24a, 24b, respectively. Acoustic sensors 22a and 22b collectively form acoustic sensing array 22. In one embodiment, acoustic sensors 22a, 22b are omnidirectional dynamic microphones. In other embodiments, a different type of microphone or sensor type can be utilized as would occur to one skilled in the art. Acoustic I/O components 30a, 30b also each include a pair of signal conductors 33 that are alternatively designated electrode pairs 33a, 33b, respectively (shown in phantom).

Processing component 30c also includes a pair of conductors 33 alternatively designated electrode pair 33c (also shown in phantom). Processing component 30c is worn outside ears E1, E2 on the wrist of user 21, and resembles a common wrist watch device.

Figure 2:
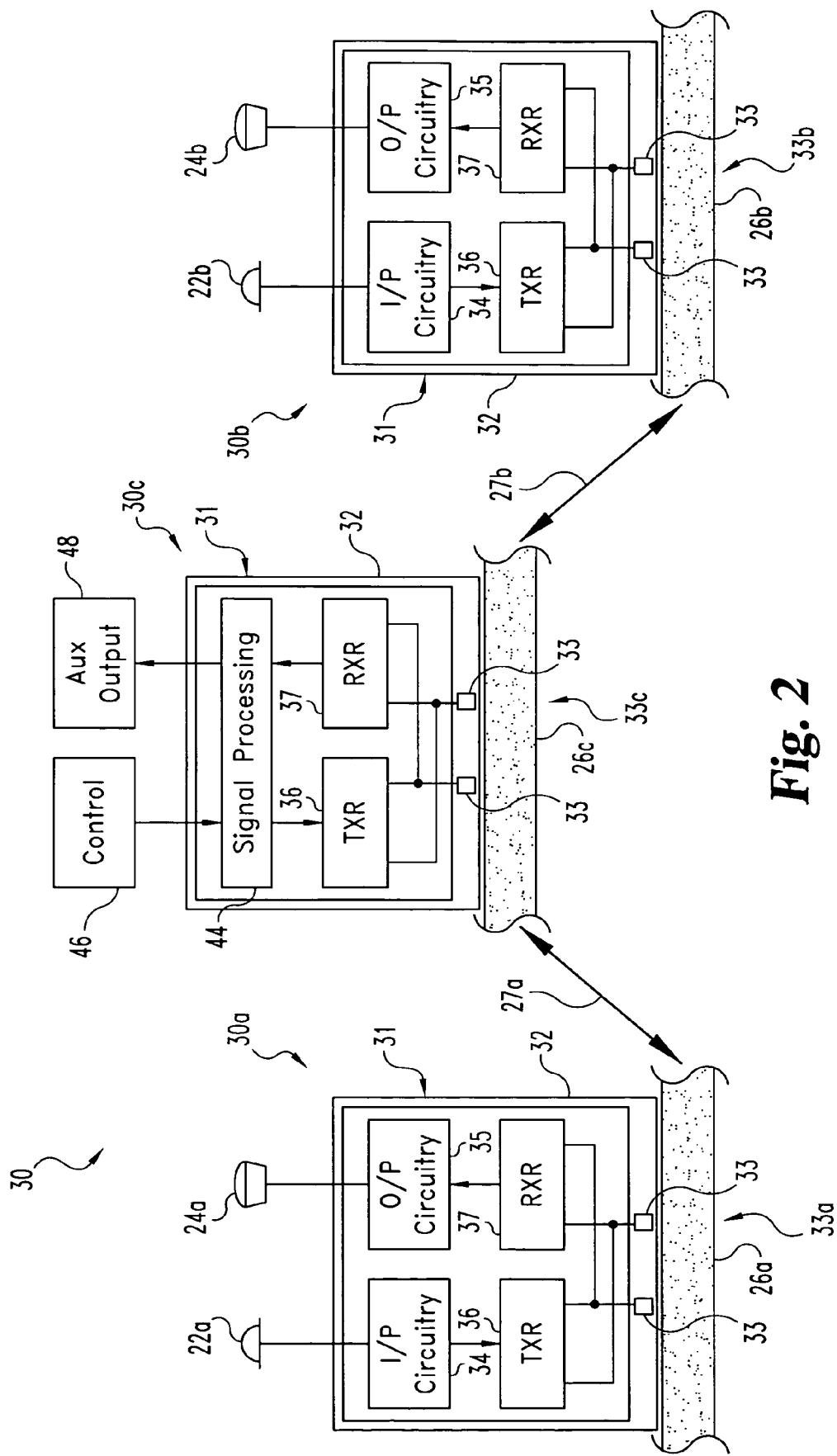
FIG. 2 is a diagrammatic view of the system of FIG. 1 showing further details of selected system components.

Referring additionally to FIG. 2, further details regarding modules 30 of system 20 are illustrated. Each of modules 30 includes circuit housing 31. Circuit housing 31 has an outer layer 32 that at least partially covers conductors 33 of the corresponding electrode pair 33a, 33b, 33c. Layer 32 is typically in the form of a dielectric material suitable for long-term contact with skin 26 of user 21. In FIG. 2, components 30a, 30b, 30c are more specifically shown in contact with respective skin regions 26a, 26b, 26c.

Each acoustic signal input/output component 30a, 30b includes input (I/P) circuitry 34 coupled to a respective acoustic sensor 22a, 22b and output (O/P) circuitry 35 coupled to a respective earphone 24a, 24b. The input circuitry 34 is further coupled to a corresponding transmitter circuit (TXR) 36. For each acoustic I/O component 30a, 30b, input circuitry 34 conditions signals received from the respective acoustic sensor 22a, 22b for transmission by the transmitter 36 coupled thereto. In one embodiment, input circuitry 34 includes filtering, amplification, and an analog-to-digital (A/D) converter to provide a signal to transmitter 36 in a desired digital format. For this embodiment, transmitter 36 can be arranged to modulate digital input from input circuitry 34 using pulse code modulation (PCM), pulse amplitude modulation (PAM) such as a frequency-shift-keying (FSK) technique, or a different digital communication scheme as would occur to those skilled in the art.

In another embodiment, input circuitry 34 is configured to transmit an analog signal representative of acoustic excitation detected by the respective acoustic sensor 22a or 22b. For this embodiment, transmitter 36 can be configured to transmit signals in a frequency modulated (FM) form or other analog communication format as would occur to those skilled in the art. In still other embodiments, input circuitry 34 and/or transmitter 36 can be configured in a different manner, such as two or more separate units; or as a single, integral transmission unit.

Output circuitry 35 for each acoustic I/O component 30a, 30b is operatively coupled to a corresponding receiver circuit (RXR) 37. Output circuitry 35 receives communication signals from the coupled receiver 37 and is arranged to condition such signals to provide a desired output to a respective earphone 24a or 24b of the corresponding acoustic I/O component 30a or 30b. As described in connection with input circuitry 34 and transmitter 36, output circuitry 35 and receiver 37 are configured to compatibly process signals based on the desired communication format.

Processing component 30c also includes one or more transmitters 36 and receivers 37 which are operatively coupled to signal processing subsystem 44. Processing component 30c further includes a user input control 46 and auxiliary output 48 coupled to signal processing subsystem 44. Signal processing subsystem 44 processes inputs received by the one or more receivers 37 of processing component 30c and generates corresponding output signals for transmission by the one or more transmitters 36 of processing component 30c.

Communication between modules 30 is performed by electrical conduction along one or more pathways formed by skin 26. The double-headed arrows 27a, 27b represent such communication pathways along portions of skin 26 between skin regions 26a, 26b, and 26c. Electrode pairs 33a, 33b, 33c provide for electrical coupling of components 30a, 30b, 30c to skin regions 26a, 26b, 26c, respectively. The electrical properties of human skin under nominal conditions facilitate the transmission of information in the form of a time varying electrical signal. Electrical conduction using human skin as a transmission medium can be described using a lumped element model at lower signal frequencies or a waveguide model at higher signal frequencies. To transmit an electric signal along skin 26, transmitter 36 of one of modules 30 applies a suitable time varying electric potential across a corresponding one of the electrode pairs 33a, 33b, 33c electrically coupled to skin 26. The electric signal is transmitted by a closed electric circuit that links the communicating modules 30. This closed circuit includes electrical conduction pathways formed by skin 26 between the electrode pairs 33a, 33b, 33c of the communicating modules 30.

Because of the intervening dielectric layer 32, electrode pairs 33a, 33b, 33c capacitively couple to the respective skin regions 26a, 26b, 26c. Layer 32 is composed and dimensioned relative to operating frequencies selected for transmitters 34 and receivers 37 to provide for suitable communication between modules 30 of system 20. In other embodiments, layer 32 may be absent, permitting direct contact between conductors 33 and skin 26, thereby allowing transmission by resistive coupling.

During operation of system 20, sound is detected with acoustic sensors 22a, 22b of components 30a, 30b. The corresponding acoustic input signals are conditioned with input circuitry 34 and supplied to transmitter 36 for each of the acoustic I/O components 30a, 30b. Transmitter 36 transmits the conditioned acoustic input signals along pathways 27a, 27b through electrode pairs 33a, 33b coupled to skin regions 26a, 26b, respectively. Processing component 30c receives signals transmitted along pathways 27a, 27b with its one or more receivers 37 via electrical coupling of electrode pair 33c with skin region 26c. Processing component 30c processes received signals with signal processing subsystem 44. A few nonlimiting examples of various configurations of subsystem 44 are described in connection with the signal processing arrangements of FIGS. 6–15 hereinafter.

Processing component 30c transmits corresponding acoustic output signals to acoustic I/O components 30a, 30b along pathways 27a, 27b with its one or more transmitters 36 via electrode pair 33c. Each acoustic I/O component 30a, 30b receives acoustic output signals supplied by processing component 30c with a corresponding receiver 37. The receivers 37 of acoustic I/O components 30a, 30b provide signals to the corresponding output circuitry 37 that drives a respective earphone 24a, 24b.

Processing component 30c also includes user input control 46 and auxiliary output 48. Control 46 can be utilized to change user-selectable parameters for signal processing subsystem 44. Alternatively or additionally, control 46 can provide for selection between different signal processing arrangements for system 20, such as those described in connection with FIGS. 6–15 to name just a few. Auxiliary output 48 can be used to perform diagnostics and maintenance for system 20 and/or to provide output signals from component 30c to a loudspeaker as an addition or alternative to earphones 24a, 24b.

Modules 30 are each capable of "two way" communication given the ability to both transmit and receive communication signals. For each module 30, one electrode pair 33a, 33b, or 33c is shared by the corresponding transmitter(s) 36 and receiver(s) 37. In an alternative embodiment, one or more modules can include multiple electrode pairs, with a different electrode pair dedicated to each module transmitter or receiver. Further, to distinguish between different communication sources and destinations, different carrier frequencies can be used. Accordingly, processing component 30c could include a different transmitter and receiver for each acoustic I/O component 30a, 30b or multiplex between settings of a single transmitter and receiver. Alternatively or additionally, transmitted signals can be encoded with signal source and/or signal destination information for later decoding by the receiving component.

In other alternative embodiments, communication between certain modules is only one-way (unidirectional). Such one-way communication may be desired when a hearing aid system component only includes an acoustic input device such as sensor 22a or 22b or only an acoustic output device, such as earphone 24a or 24b. Further, different communication signal formats/modulations can be used for different communication pathways. In still further embodiments, one or more communication techniques besides electrical conduction along the skin are utilized.

Figure 3:
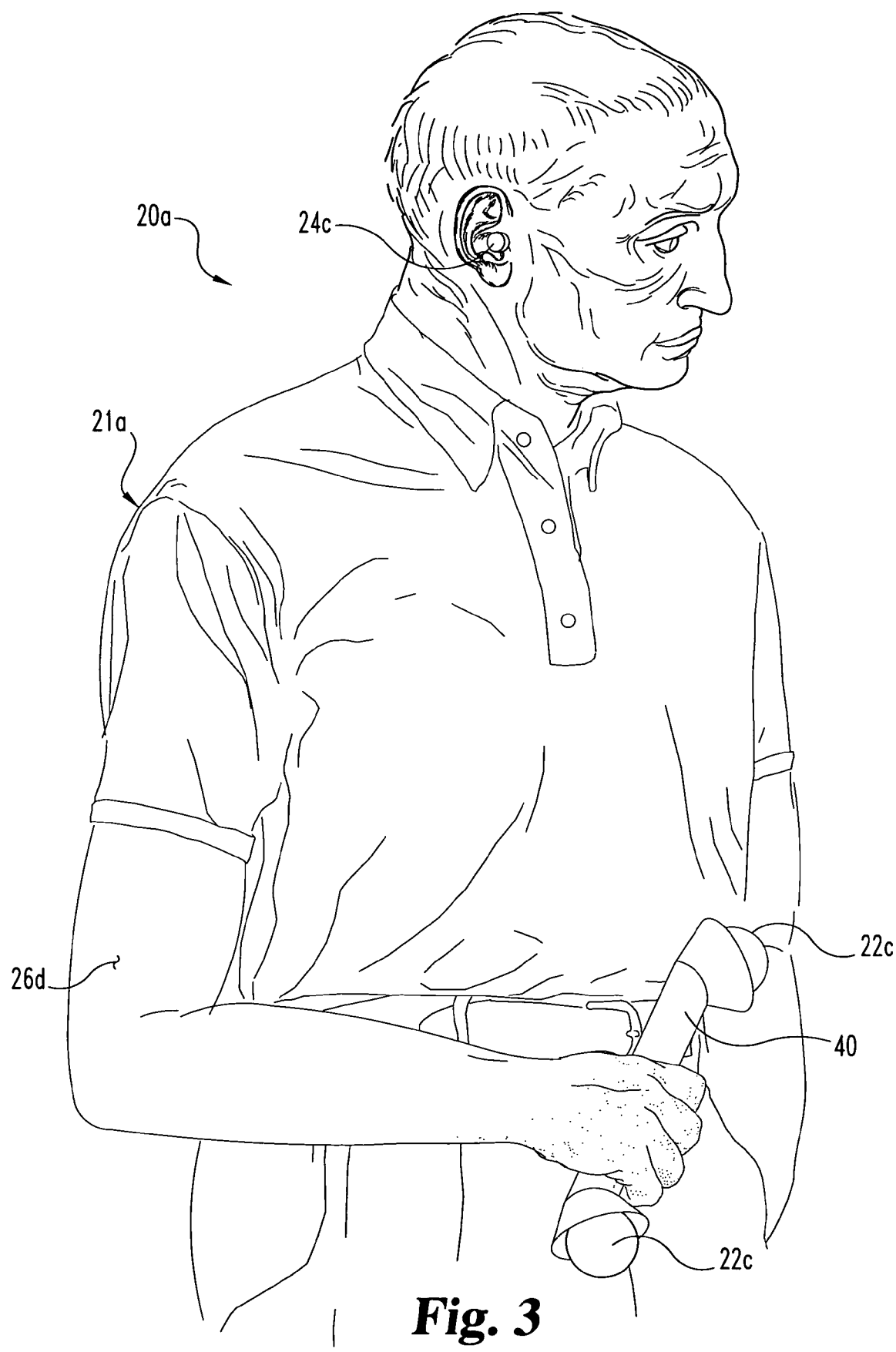
FIG. 3 is a diagrammatic view of another hearing aid system.

Referring to FIG. 3, hearing aid system 20a of another embodiment of the present invention is illustrated. System 20a includes directional receiving wand 40 with two opposed acoustic sensors 22c. System 20a also includes earphone device 24c. Wand 40 and device 24c communicate via electrical conduction along one or more pathways formed by skin 26d of user 21a. Accordingly, device 24c and wand 40 each include a pair of electrodes (not shown) for electrically coupling with skin 26d. Furthermore, these devices include transmitter and/or receiver circuitry as necessary to implement desired communication pathways. In one embodiment of system 20a, wand 40 includes signal processing subsystem 44 and sensors 22c in a single handheld unit. This unit has a one-way communication path with earphone device 24c. In another embodiment, a signal processing subsystem is partially or completely included in earphone device 24c. In still other embodiments, a separate module (not shown) performs processing, such as a device worn around the neck of user 21a, a device worn on the user's wrist as illustrated in FIG. 1, or such other type of device as would occur to those skilled in the art. As in the case of system 20, system 20a can include more than one earphone device, too.

Figure 4:
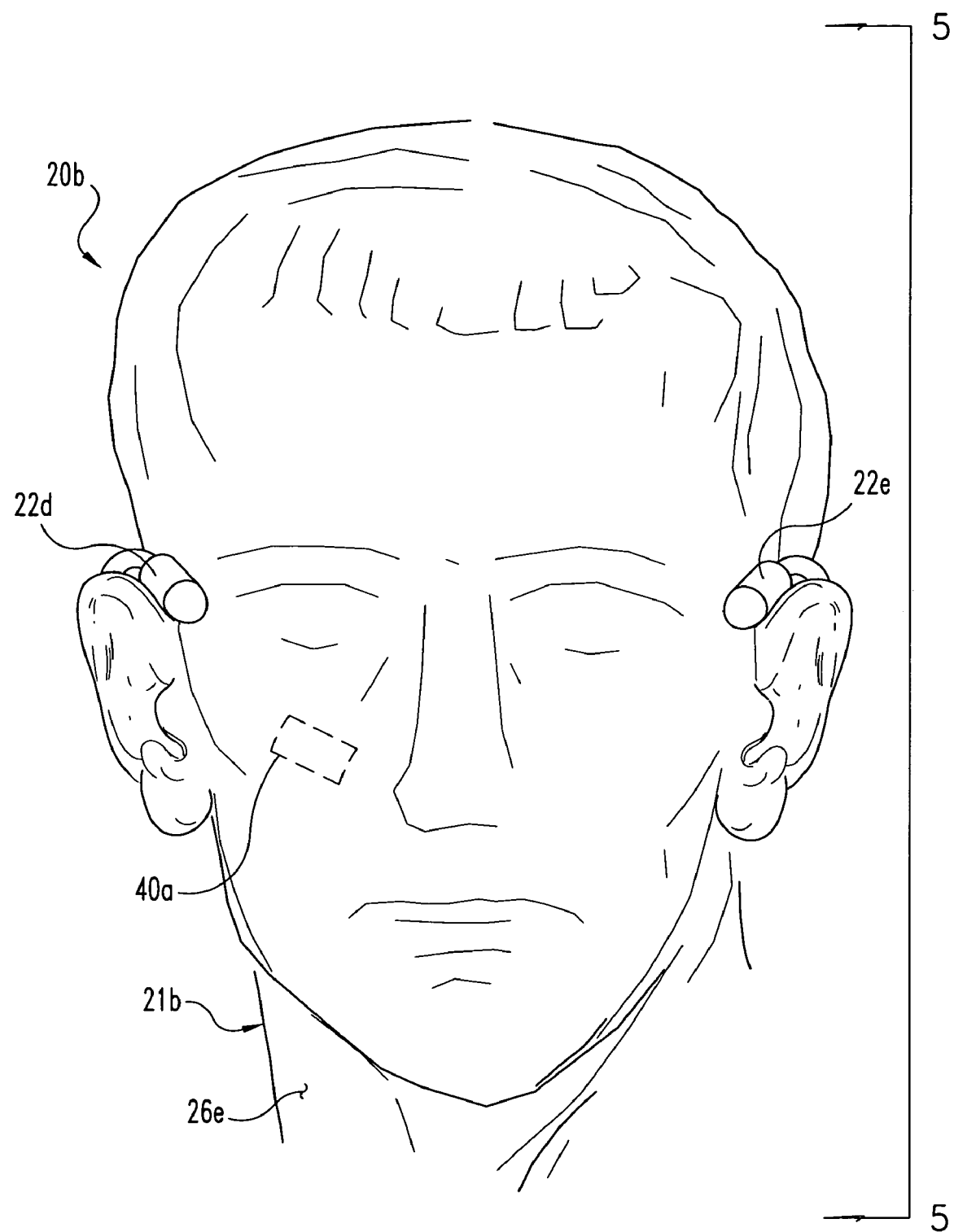
FIGS. 4 and 5 illustrate yet another hearing aid system including a cochlear implant.
Figure 5:
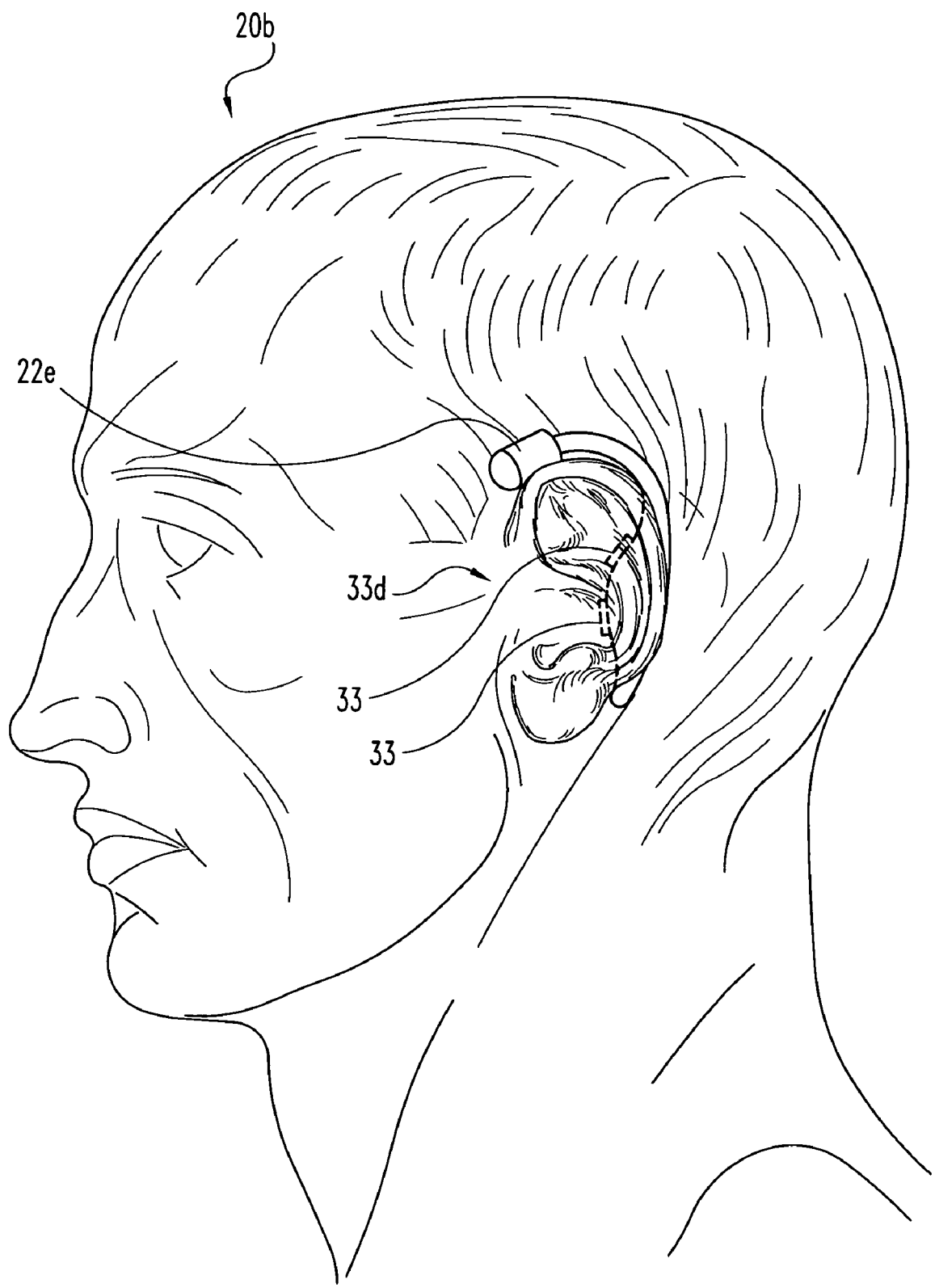

Referring to FIGS. 4 and 5, hearing aid system 20b of yet another embodiment of the present invention is illustrated. System 20b includes a pair of behind-the-ear acoustic sensor units 22d, 22e. More particularly, FIG. 5 shows a partial side view of sensor unit 22e and further illustrates conductors 33 (in phantom) which are also designated as electrode pair 33d. System 20b further includes cochlear implant 40a. Cochlear implant 40a is disposed in a middle ear passage of user 21b and is configured to provide electrical stimulation signals along the middle ear in a standard manner. Devices 22d and 22e communicate with implant 40a by electrical conduction along pathways formed by skin 26e of user 21b. One or more of devices 22d, 22e, 40a can include signal processing circuitry desired to provide enhanced hearing perception via cochlear implant 40a. In one embodiment, one of devices 22d, 22e houses such circuitry with the other being in one-way communication to provide a corresponding acoustic sensor input signal. In still other embodiments, additional components may be included to partially or completely contain a signal processing subsystem arranged for communication with devices 22d, 22e, 40a by electrical signal conduction along skin 26e.

It should be understood that modules of systems 20, 20a, 20b include power supplies and other components as would occur to those skilled in the art for implementation. Also, in other embodiments, modules of the various systems 20, 20a, 20b may be exchanged, duplicated, or deleted as would occur to those skilled in the art. Also, various signal processing techniques may be implemented by the processing components of systems 20, 20a, 20b, a few of which are described in connection with FIGS. 6–15 as follows.

Figure 6:
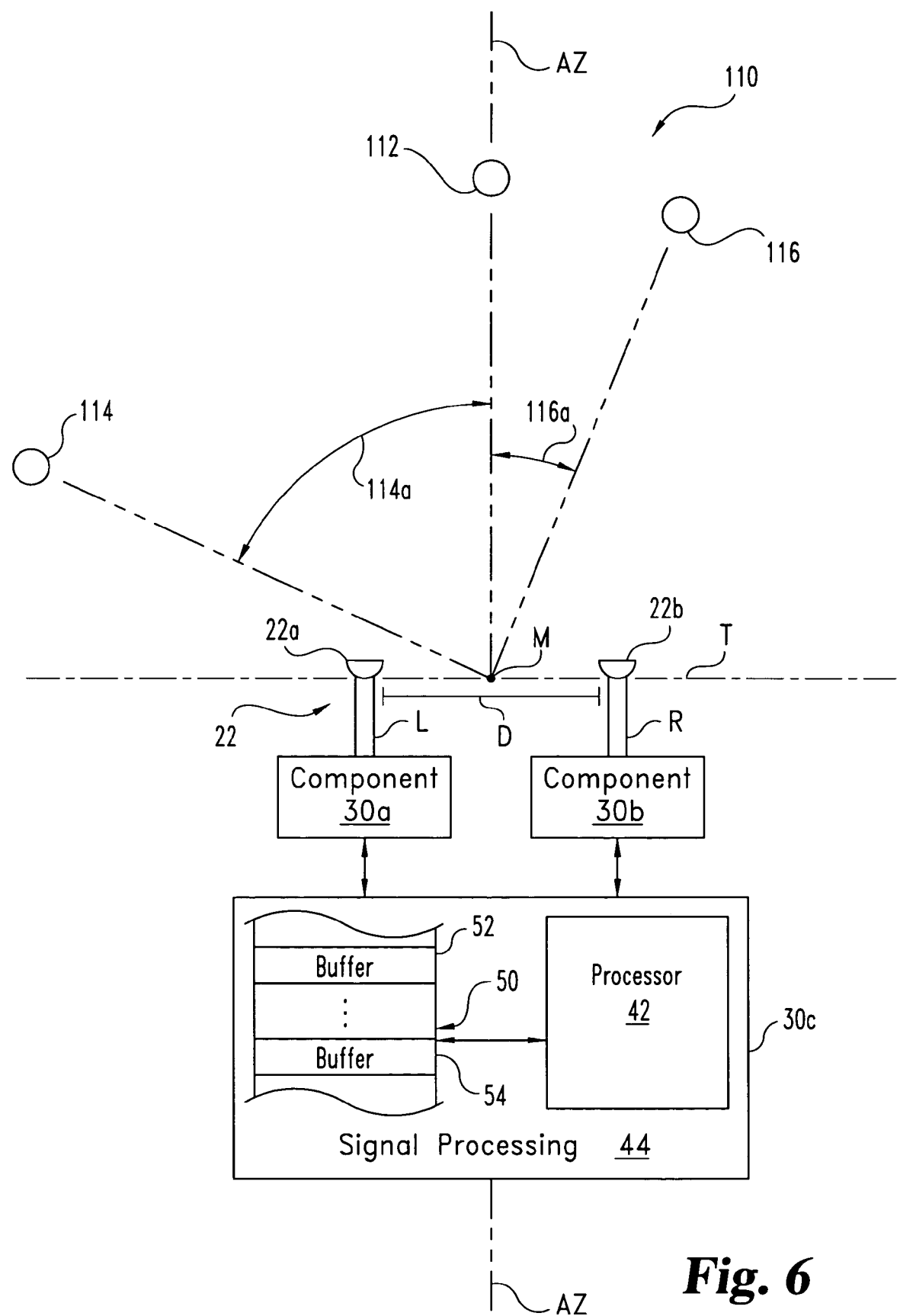
FIG. 6 is a diagrammatic view of a signal processing arrangement for the system of FIG. 1.

Referring to FIGS. 1 and 6, one embodiment of a signal processing arrangement 110 for system 20 is next described, where like reference numerals refer to like features. Arrangement 110 is configured to extract a desired acoustic excitation from a desired source, such as source 112, while suppressing noise from other sources, such as acoustic sources 114, 116. For arrangement 110, acoustic sensors 22a, 22b of array 22 are oriented to detect acoustic excitation from sources 112, 114, 116. It should be understood that this configuration of sources is merely one example. Accordingly, in other embodiments, more of fewer sources with different orientations can be present.

Sensors 22a, 22b are separated by distance D as illustrated by the like labeled line segment along lateral axis T. Lateral axis T is perpendicular to azimuthal axis AZ. Midpoint M represents the halfway point along distance D between sensor 22a and sensor 22b. Axis AZ intersects midpoint M and acoustic source 112. Axis AZ is designated as a point of reference (zero degrees) for sources 112, 114, 116 in the azimuthal plane and for sensors 22a, 22b. For the depicted embodiment, sources 114, 116 define azimuthal angles 114a, 116a relative to axis AZ of about −65° and +22°, respectively. Correspondingly, acoustic source 112 is at 0° relative to axis AZ. In one mode of operation, the "on axis" alignment of acoustic source 112 with axis AZ selects it as a desired source of acoustic excitation to be monitored with arrangement 110. In contrast, the "off-axis" sources 114, 116 are treated as noise and suppressed by arrangement 110, which is explained in more detail hereinafter. To adjust the direction being monitored, sensors 22a, 22b can be moved to change the position of axis AZ. Accordingly, user 21 can move his or her head to change the relative position of axis AZ defined between sensors 22a, 22b for arrangement 110. In an additional or alternative operating mode, the designated monitoring direction can be adjusted by changing a direction indicator incorporated in the routine of FIG. 7 as more fully described below. For these operating modes, it should be understood that neither sensor 22a nor 22b needs to be moved to change the designated monitoring direction, and the designated monitoring direction need not be coincident with axis AZ.

For the convenience of description, sensors 22a, 22b are designated as belonging to left channel L and right channel R, respectively. Further, the analog time domain signals provided by sensors 22a, 22b are designated $x_L(t)$ and $x_R(t)$ for the respective channels L and R, where t represents time. Components 30a, 30b condition and format input signals $x_L(t)$ and $x_R(t)$ in a manner suitable for transmission to processing component 30c. Either before or after transmission, signals $x_L(t)$ and $x_R(t)$ undergo an analog-to-digital (A/D) conversion with appropriate sampling hardware to provide discrete signals $x_L(z)$ and $x_R(z)$, corresponding to channels L and R, respectively; where z indexes discrete sampling events. The sampling rate $f_s$ is selected to provide desired fidelity for a frequency range of interest.

For arrangement 110, signal processing subsystem 44 is configured to include signal processor 42 operatively coupled to memory 50. Memory 50 is further depicted with buffers 52, 54. Processor 42 can be a software or firmware programmable device, a state logic machine, or a combination of both programmable and dedicated hardware. Furthermore, processor 42 can be comprised of one or more components and can include one or more Central Processing Units (CPUs). In one embodiment, processor 42 is in the form of a digitally programmable, highly integrated semiconductor chip particularly suited for signal processing. In other embodiments, processor 42 may be of a general purpose type or other arrangement as would occur to those skilled in the art. Likewise, memory 50 can be variously configured as would occur to those skilled in the art. Memory 50 can include one or more types of solid-state electronic memory, magnetic memory, or optical memory of the volatile and/or nonvolatile variety. Furthermore, memory can be integral with processor 42 and/or comprised of one or more distinct elements. Processing subsystem 44 can also include any oscillators, control clocks, interfaces, signal conditioners, additional filters, limiters, converters, power supplies, communication ports, or other types of components as would occur to those skilled in the art to implement the present invention. In one embodiment, subsystem 44 is provided in the form of a single microelectronic device.

Figure 7:
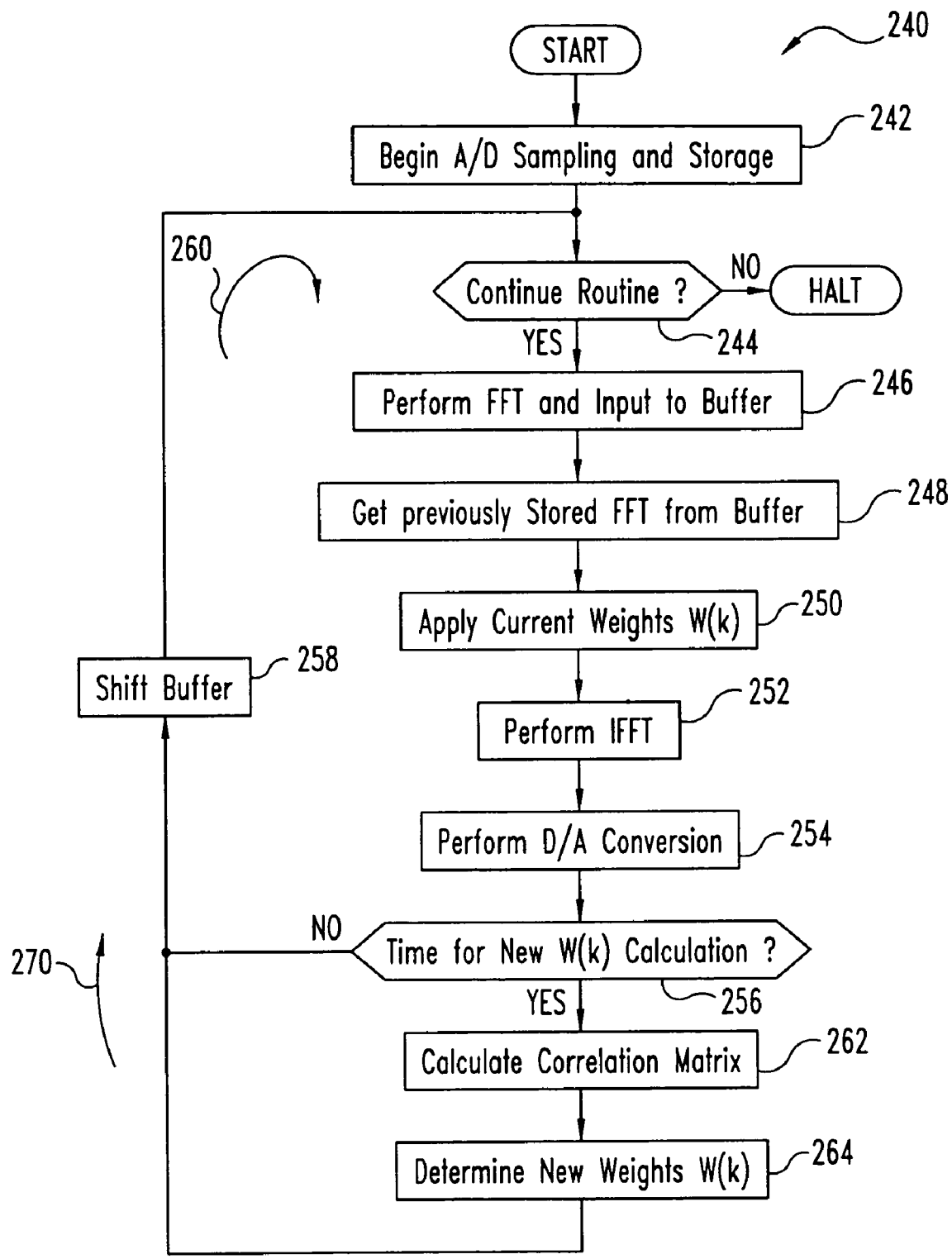
FIG. 7 is a flow chart of a routine executed with the arrangement of FIG. 6.

Referring also to the flow chart of FIG. 7, routine 240 is illustrated. In stage 242, routine 240 begins with initiation of the A/D sampling and storage of the resulting discrete input samples $x_L(z)$ and $x_R(z)$ in buffer 52 in a First-In-First-Out (FIFO) sequence. Sampling is performed in parallel with other stages of routine 240 as will become apparent from the following description. Routine 240 proceeds from stage 242 to conditional 244. Conditional 244 tests whether routine 240 is to continue. If not, routine 240 halts. Otherwise, routine 240 continues with stage 246. Conditional 244 can correspond to an operator switch, control signal, or power control associated with system 20 (not shown).

In stage 246, a fast discrete fourier transform (FFT) algorithm is executed on a sequence of samples $x_L(z)$ and $x_R(z)$ and stored in buffer 54 for each channel L and R to provide corresponding frequency domain signals $X_L(k)$ and $X_R(k)$; where k is an index to the discrete frequencies of the FFTs. The set of samples $x_L(z)$ and $x_R(z)$ upon which an FFT is performed can be described in terms of a time duration of the sample data. Typically, for a given sampling rate $f_s$, each FFT is based on more than 100 samples. Furthermore, for stage 246, FFT calculations include application of a windowing technique to the sample data. One embodiment utilizes a Hamming window. In other embodiments, data windowing can be absent or a different type utilized, the FFT can be based on a different sampling approach, and/or a different transform can be employed as would occur to those skilled in the art. After the transformation, the resulting spectra $X_L(k)$ and $X_R(k)$ are stored in FFT buffer 54 of memory 50. These spectra are generally complex-valued.

It has been found that reception of acoustic excitation emanating from a desired direction can be improved by weighting and summing the input signals in a manner arranged to minimize the variance (or equivalently, the energy) of the resulting output signal while under the constraint that signals from the desired direction are output with a predetermined gain. The following relationship (1) expresses this linear combination of the frequency domain input signals:

$$Y(k) = W_L^*(k)X_L(k) + W_R^*(k)X_R(k) = W^H(k)X(k); \quad (1)$$

where:

$$W(k) = \begin{bmatrix} W_L(k) \\ W_R(k) \end{bmatrix};$$

$$X(k) = \begin{bmatrix} X_L(k) \\ X_R(k) \end{bmatrix};$$

Y(k) is the output signal in frequency domain form, $W_L(k)$ and $W_R(k)$ are complex valued multipliers (weights) for each frequency k corresponding to channels L and R, the superscript "*" denotes the complex conjugate operation, and the superscript "H" denotes taking the Hermitian of a vector. For this approach, it is desired to determine an "optimal" set of weights $W_L(k)$ and $W_R(k)$ to minimize variance of Y(k). Minimizing the variance generally causes cancellation of sources not aligned with the desired direction. For the mode of operation where the desired direction is along axis AZ, frequency components which do not originate from directly ahead of the array are attenuated because they are not consistent in phase across the left and right channels L, R, and therefore have a larger variance than a source directly ahead. Minimizing the variance in this case is equivalent to minimizing the output power of off-axis sources, as related by the optimization goal of relationship (2) that follows:

$$\min_w E\{|Y(k)|^2\} \quad (2)$$

where Y(k) is the output signal described in connection with relationship (1). In one form, the constraint requires that "on axis" acoustic signals from sources along the axis AZ be passed with unity gain as provided in relationship (3) that follows:

$$e^H W(k) = 1 \quad (3)$$

Here e is a two element vector which corresponds to the desired direction. When this direction is coincident with axis AZ, sensors 22a and 22b generally receive the signal at the same time and amplitude, and thus, for source 112 of the illustrated embodiment, the vector e is real-valued with equal weighted elements—for instance $e^H = [0.5\ 0.5]$. In contrast, if the selected acoustic source is not on axis AZ, then sensors 22a, 22b can be moved to align axis AZ with it.

In an additional or alternative mode of operation, the elements of vector e can be selected to monitor along a desired direction that is not coincident with axis AZ. For such operating modes, vector e becomes complex-valued to represent the appropriate time/phase delays between sensors 22a, 22b that correspond to acoustic excitation off axis AZ. Thus, vector e operates as the direction indicator previously described. Correspondingly, alternative embodiments can be arranged to select a desired acoustic excitation source by establishing a different geometric relationship relative to axis AZ. For instance, the direction for monitoring a desired source can be disposed at a nonzero azimuthal angle relative to axis AZ. Indeed, by changing vector e, the monitoring direction can be steered from one location to another without moving either sensor 22a, 22b.

For inputs $X_L(k)$ and $X_R(k)$ that are indicative of stationary random processes (which is typical of speech signals over small periods of time), the following weight vector W(k) relationship (4) can be determined from relationships (2) and (3):

$$W(k) = \frac{R(k)^{-1}e}{e^H R(k)^{-1} e} \quad (4)$$

where e is the vector associated with the desired reception direction, R(k) is the correlation matrix for the $k^{th}$ frequency, W(k) is the optimal weight vector for the $k^{th}$ frequency and the superscript "−1" denotes the matrix inverse. The derivation of this relationship is explained in connection with a general model of the present invention applicable to embodiments with more than two sensors 22a, 22b in array 22.

The correlation matrix R(k) can be estimated from spectral data obtained via a number "M" of fast discrete Fourier transforms (FFTs) calculated over a relevant time interval. For the two channel L, R embodiment, the correlation matrix for the $k^{th}$ frequency, R(k), is expressed by the following relationship (5):

$$R(k) = \begin{bmatrix} \frac{M}{N} \sum_{n=1}^{N} X_l^*(n,k) X_l(n,k) & \frac{1}{N} \sum_{n=1}^{N} X_l^*(n,k) X_r(n,k) \\ \frac{1}{N} \sum_{n=1}^{N} X_r^*(n,k) X_l(n,k) & \frac{M}{N} \sum_{n=1}^{N} X_r^*(n,k) X_r(n,k) \end{bmatrix}$$

$$= \begin{bmatrix} X_{ll}(k) & X_{lr}(k) \\ X_{rl}(k) & X_{rr}(k) \end{bmatrix} \quad (5)$$

wherein $X_l$ is the FFT in the frequency buffer for the left channel L and $X_r$ is the FFT in the frequency buffer for right channel R obtained from previously stored FFTs that were calculated from an earlier execution of stage 246; "n" is an index to the number "N" of FFTs used for the calculation; and "M" is a regularization parameter. The terms $X_{ll}(k)$, $X_{lr}(k)$, $X_{rl}(k)$, and $X_{rr}(k)$ represent the weighted sums for purposes of compact expression. It should be appreciated that the elements of the R(k) matrix are nonlinear, and therefore Y(k) is a nonlinear function of the inputs.

Accordingly, in stage 248 spectra $X_l(k)$ and $X_r(k)$ previously stored in buffer 54 are read from memory 50 in a First-In-First-Out (FIFO) sequence. Routine 240 then proceeds to stage 250. In stage 250, multiplier weights $W_L(k)$, $W_R(k)$ are applied to $X_l(k)$ and $X_r(k)$, respectively, in accordance with the relationship (1) for each frequency k to provide the output spectra Y(k). Routine 240 continues with stage 252 which performs an Inverse Fast Fourier Transform (IFFT) to change the Y(k) FFT determined in stage 250 into a discrete time domain form designated y(z). It should be understood that correspondence between Y(k) FFTs and output sample y(z) can vary. In one embodiment, there is one Y(k) FFT output for every y(z), providing a one-to-one correspondence. In another embodiment, there may be one Y(k) FFT for every 16 output samples y(z) desired, in which case the extra samples can be obtained from available Y(k) FFTs. In still other embodiments, a different correspondence may be established.

Next, in stage 254, digital-to-analog (D/A) conversion is performed with appropriate hardware to provide a corresponding analog output signal y(t). After conversion to the continuous time domain form, signal y(t) is transmitted from subsystem 44 of processing component 30c to acoustic I/O components 30a, 30b. Output circuitry 37 conditions the received signals and drives earphones 24a, 24b. Arrangement 110 can be used to deliver generally the same sound to each ear of a user. Alternatively arrangement 110 can include further processing of output signals derived from y(t) to provide sound to each ear that selectively differs in terms of intensity and/or timing to account for differences in the orientation of the desired sound source relative to acoustic sensors 22a, 22b to improve sound perception.

After stage 254, routine 240 continues with conditional 256. In many applications it may not be desirable to recalculate the elements of weight vector W(k) for every Y(k). Accordingly, conditional 256 tests whether a desired time interval has passed since the last calculation of vector W(k). If this time period has not lapsed, then control flows to stage 258 to shift buffers 52, 54 to process the next group of signals. From stage 258, processing loop 260 closes, returning to conditional 244. Provided conditional 244 remains true, stage 246 is repeated for the next group of samples of $x_L(z)$ and $x_R(z)$ to determine the next pair of $X_L(k)$ and $X_R(k)$ FFTs for storage in buffer 54. Also, with each execution of processing loop 260, stages 248, 250, 252, 254 are repeated to process previously stored $X_l(k)$ and $X_r(k)$ FFTs to determine the next Y(k) FFT and correspondingly generate a continuous y(t). In this manner buffers 52, 54 are periodically shifted in stage 258 with each repetition of loop 260 until either process 240 halts as tested by conditional 244 or the time period of conditional 256 has lapsed.

If the test of conditional 256 is true, then routine 240 proceeds from the affirmative branch of conditional 256 to calculate the correlation matrix R(k) in accordance with relationship (5) in stage 262. From this new correlation matrix R(k), an updated vector W(k) is determined in accordance with relationship (4) in stage 264. From stage 264, update loop 270 continues with stage 258 previously described, and processing loop 260 is re-entered until routine 240 halts per conditional 244 or the time for another recalculation of vector W(k) arrives. Notably, the time period tested in conditional 256 may be measured in terms of the number of times loop 260 is repeated, the number of FFTs or samples generated between updates, and the like. Alternatively, the period between updates can be dynamically adjusted based on feedback from an operator or monitoring device (not shown).

Processing subsystem 44 performs the tests of conditionals 244 and 256, and executes the operations associated with stages 246, 248, 250, 252, 258, 262, and 264 of routine 240. In one embodiment, signal processor 42 is of a programmable type with software configured to execute these stages and conditionals. In other embodiments, some or all of these operations may be performed with dedicated hardware of subsystem 44. The A/D and D/A conversion operations of stages 242 and 254, respectively, can be performed by subsystem 44 or by acoustic I/O components 30a, 30c as appropriate for the particular type of communication signal format desired.

When routine 240 initially starts, earlier stored data is not generally available. Accordingly, appropriate seed values may be stored in buffers 52, 54 in support of initial processing. In other embodiments, a greater number of acoustic sensors can be included in array 22 and routine 240 can be adjusted accordingly. For this more general form, the output can be expressed by relationship (6) as follows:

$$Y(k) = W^H(k) X(k) \quad (6)$$

where the X(k) is a vector with an entry for each of "C" number of input channels and the weight vector W(k) is of like dimension. Equation (6) is the same at equation (1) but the dimension of each vector is C instead of 2. The output power can be expressed by relationship (7) as follows:

$$E[Y(k)^2]=E[W(k)^H X(k) X^H(k) W(k)]=W(k)^H R(k) W(k) \quad (7)$$

where the correlation matrix R(k) is square with "C×C" dimensions. The vector e is the steering vector describing the weights and delays associated with a desired monitoring direction and is of the form provided by relationship (8) that follows:

$$e(\phi) = \frac{1}{C}\begin{bmatrix} 1 & e^{+j\phi(k)} & \ldots & e^{+j(C-1)\phi(k)} \end{bmatrix}^T \quad (8)$$

where C is the number of array elements and $\phi$ is the desired monitoring direction expressed by relationship (9) as:

$$\phi(k)=(2\pi Dk f_s/(CN)) \text{ for } k=0,1,\ldots,N-1 \quad (9)$$

Thus, vector e may be varied with frequency to change the desired monitoring direction or "look-direction" and correspondingly steer the array. With the same constraint regarding vector e as described by relationship (3), the problem can be summarized by relationships (10) as follows:

$$\underset{W(k)}{\text{Minimize}}\{W(k)^H R(k) W(k)\} \text{ such that } e^H W(k) = 1 \quad (10)$$

This problem can be solved using the method of Lagrange multipliers generally characterized by relationship (11) as follows:

$$\underset{W(k)}{\text{Minimize}}\{CostFunction + \lambda^* Constraint\} \quad (11)$$

where the cost function is the output power, and the constraint is as listed above for vector e. A general vector solution begins with the Lagrange multiplier function H(W) of relationship (12):

$$H(W) = \frac{1}{2} W(k)^H R(k) W(k) + \lambda(e^H W(k) - 1) \quad (12)$$

where the factor of one half (½) is introduced to simplify later math. Taking the gradient of H(W) with respect to W(k), and setting this result equal to zero, relationship (13) results as follows:

$$\nabla_W H(W) = R(k) W(k) + e\lambda = 0 \quad (13)$$

Also, relationship (14) follows:

$$W(k) = -R(k)^{-1} e\lambda \quad (14)$$

Using this result in the constraint equation relationships (15) and (16) result as follows:

$$e^H[-R(k)^{-1} e\lambda] = 1 \quad (15)$$

$$\lambda = -[e^H R(k)^{-1} e]^{-1} \quad (16)$$

and using relationship (114), the optimal weights are as set forth in relationship (17):

$$W_{opt} = R(k)^{-1} e [e^H R(k)^{-1} e]^{-1} \quad (17)$$

Because the bracketed term is a scalar, relationship (4) has this term in the denominator, and thus is equivalent.

Returning to the two variable case for the sake of clarity, relationship (5) may be expressed more compactly by absorbing the weighted sums into the terms $X_{ll}$, $X_{lr}$, $X_{rl}$ and $X_{rr}$, and then renaming them as components of the correlation matrix R(k) per relationship (18):

$$R(k) = \begin{bmatrix} X_{ll}(k) & X_{lr}(k) \\ X_{rl}(k) & X_{rr}(k) \end{bmatrix} = \begin{bmatrix} R_{11} & R_{12} \\ R_{21} & R_{22} \end{bmatrix} \quad (18)$$

Its inverse may be expressed in relationship (19) as:

$$R(k)^{-1} = \begin{bmatrix} R_{22} & -R_{12} \\ -R_{21} & R_{11} \end{bmatrix} * \frac{1}{\det(R(k))} \quad (19)$$

where det( ) is the determinant operator. If the desired monitoring direction is perpendicular to the sensor array, $e=[0.5\ 0.5]^T$, the numerator of relationship (4) may then be expressed by relationship (20) as:

$$R(k)^{-1} e = \begin{bmatrix} R_{22} & -R_{12} \\ -R_{21} & R_{11} \end{bmatrix}\begin{bmatrix} 0.5 \\ 0.5 \end{bmatrix} * \quad (20)$$

$$\frac{1}{\det(R(k))} = \begin{bmatrix} R_{22} & -R_{12} \\ R_{11} & -R_{21} \end{bmatrix} * \frac{0.5}{\det(R(k))}$$

Using the previous result, the denominator is expressed by relationship (21) as:

$$e^H R(k)^{-1} e = [0.5\ 0.5] * \begin{bmatrix} R_{22} & -R_{12} \\ R_{11} & -R_{21} \end{bmatrix} * \frac{1}{\det(R(k))} = \quad (21)$$

$$(R_{11} + R_{22} - R_{12} - R_{21}) * \frac{0.5}{\det(R(k))}$$

Canceling out the common factor of the determinant, the simplified relationship (22) is completed as:

$$\begin{bmatrix} w_1 \\ w_2 \end{bmatrix} = \frac{1}{(R_{11} + R_{22} - R_{12} - R_{21})} * \begin{bmatrix} R_{22} & -R_{12} \\ R_{11} & -R_{21} \end{bmatrix} \quad (22)$$

It can also be expressed in terms of averages of the sums of correlations between the two channels in relationship (23) as:

$$\begin{bmatrix} w_l(k) \\ w_r(k) \end{bmatrix} = \frac{1}{(X_{ll}(k) + X_{rr}(k) - X_{lr}(k) - X_{rl}(k))} * \begin{bmatrix} X_{rr}(k) - X_{lr}(k) \\ X_{ll}(k) - X_{rl}(k) \end{bmatrix} \quad (23)$$

where $x_l(k)$ and $w_r(k)$ are the desired weights for the left and right channels, respectively, for the $k^{th}$ frequency, and the components of the correlation matrix are now expressed by relationships (24) as:

$$X_{ll}(k) = \frac{M}{N} \sum_{n=1}^{m} X_l^*(n,k) X_l(n,k) \qquad (24)$$

$$X_{lr}(k) = \frac{M}{N} \sum_{n=1}^{m} X_l^*(n,k) X_r(n,k)$$

$$X_{rl}(k) = \frac{M}{N} \sum_{n=1}^{m} X_r^*(n,k) X_l(n,k)$$

$$X_{rr}(k) = \frac{M}{N} \sum_{n=1}^{m} X_r^*(n,k) X_r(n,k)$$

just as in relationship (5). Thus, after computing the averaged sums (which may be kept as running averages), computational load can be reduced for this two channel embodiment.

Referring to FIGS. 1 and 8–11, signal processing arrangement 310 for system 20 is described, where like reference numerals refer to like features. The signal flow diagram of FIG. 8 corresponds to various stages of arrangement 310. Left "L" and right "R" input channels correspond to acoustic sensors 22a, 22b, which provide input signals $x_{Ln}(t)$, $x_{Rn}(t)$, respectively. Input signals $x_{Ln}(t)$ and $x_{Rn}(t)$ correspond to analog composites of sounds from multiple acoustic sources located within the detection range of sensors 22a, 22b; where "t" is the familiar continuous time domain variable. Signals $x_{Ln}(t)$ and $x_{Rn}(t)$ are converted to digital form before or after transmission from acoustic I/O components 30a, 30b to provide discrete signals $x_{Ln}(k)$ and $x_{Rn}(k)$, respectively; where "k" is the discrete sample index variable.

For arrangement 310, subsystem 44 of system 20 is configured with appropriate processing hardware and/or software to include Digital Fourier Transform (DFT) stages 336a, 336b; delay operator 340; signal operator 350; localization operation 360; extraction stage 380, Inverse Fourier Transform 382; and post extraction processing 480. DFT stages 336a, 336b transform input signals $x_{Ln}(k)$ and $x_{Rn}(k)$ into spectral signals designated $X_{Ln}(m)$ and $X_{Rn}(m)$, respectively, using a short term discrete Fourier transform algorithm. Spectral signals $X_{Ln}(m)$ and $X_{Rn}(m)$ are expressed in terms of a number of discrete frequency components indexed by integer m; where m=1, 2, . . . , M. Also, as used herein, the subscripts L and R denote the left and right channels, respectively, and n indexes time frames for the discrete Fourier transform analysis.

Figure 8:
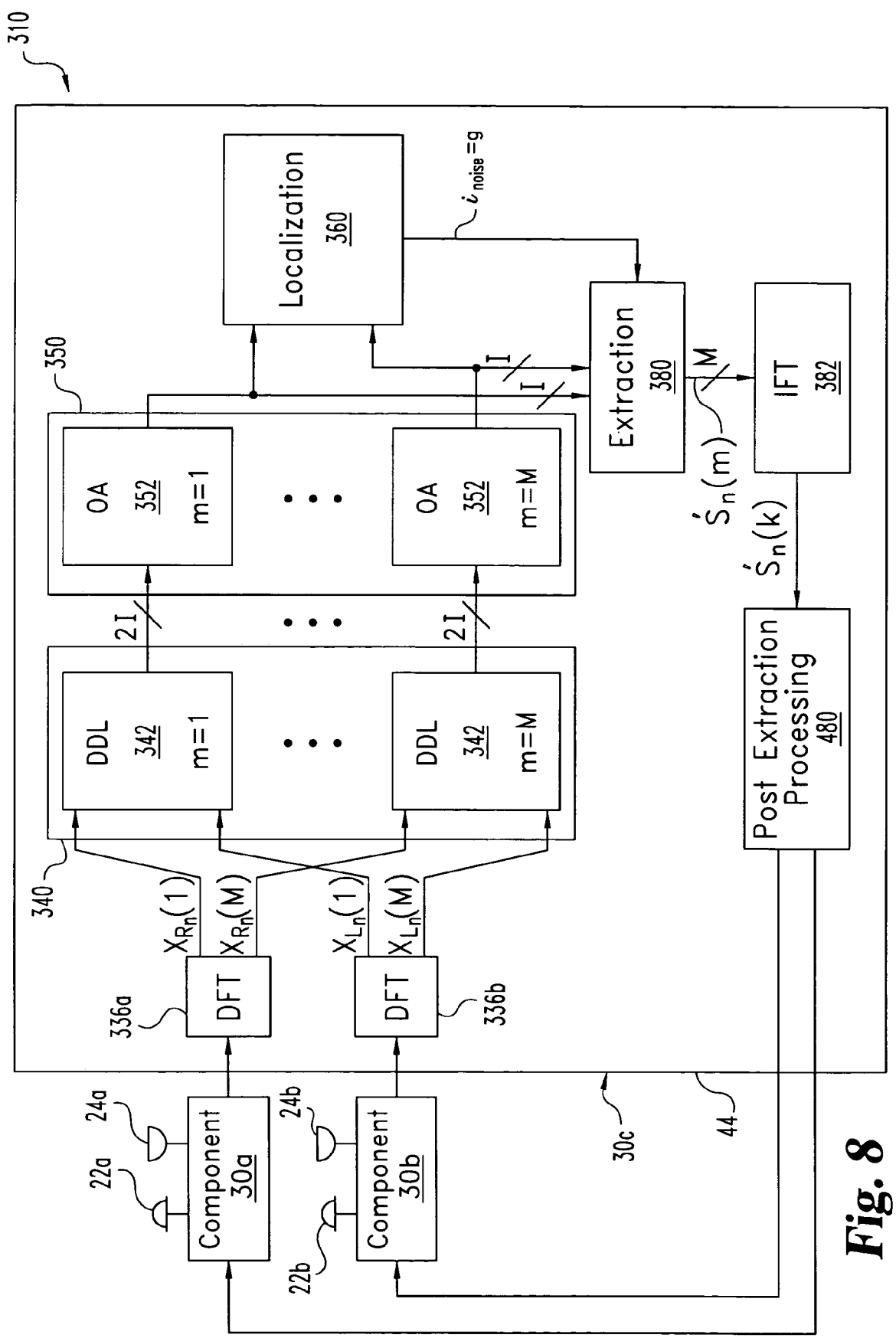
FIG. 8 is a signal flow diagram of another signal processing arrangement for the system of FIG. 1.

Delay operator 340 receives spectral signals $X_{Ln}(m)$ and $X_{Rn}(m)$ from stages 336a, 336b, respectively. Delay operator 340 includes a number of dual delay lines (DDLs) 342 each corresponding to a different one of the component frequencies indexed by m. Thus, there are M different dual delay lines 342. However, only dual delay lines 342 corresponding to m=1 and m=M are shown in FIG. 8 to preserve clarity. The remaining dual delay lines corresponding to m=2 through m=(M-1) are represented by an ellipsis.

The pair of frequency components from DFT stages 336a, 336b corresponding to a given value of m are inputs into a corresponding one of dual delay lines 342. For the examples illustrated in FIG. 8, spectral signal component pair $X_{Ln}$(m=1) and $X_{Rn}$(m=1) is sent to the upper dual delay line 342 for the frequency corresponding to m=1; and spectral signal component pair $X_{Ln}$(m=M) and $X_{Rn}$(m=M) is sent to the lower dual delay line 342 for the frequency corresponding to m=M. Likewise, common frequency component pairs of $X_{Ln}(m)$ and $X_{Rn}(m)$ for frequencies corresponding to m=2 through m=(M-1) are each sent to a corresponding dual delay line as represented by ellipses to preserve clarity.

Figure 9:
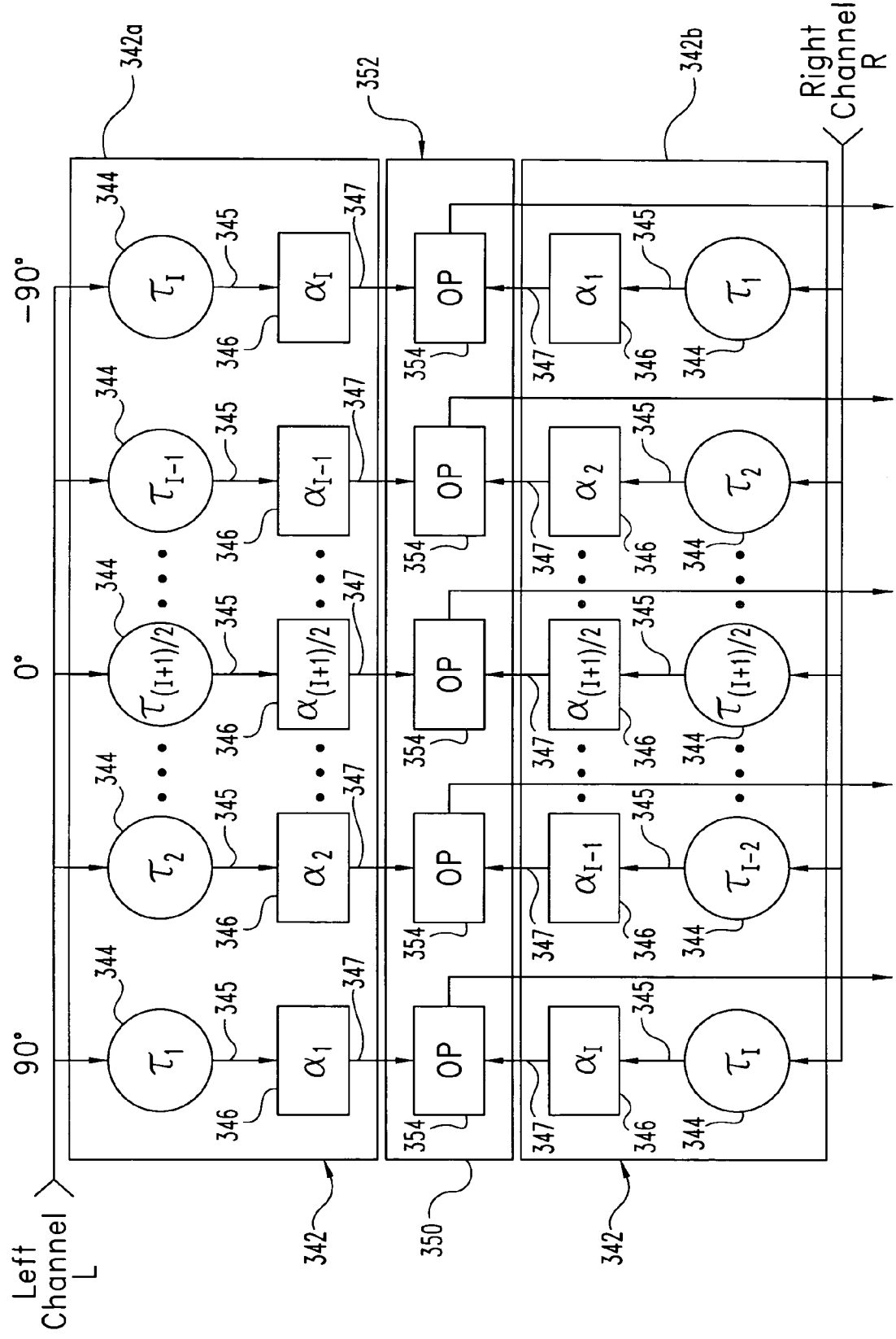
FIG. 9 is a partial, signal flow diagram illustrating selected aspects of dual delay lines of FIG. 8 in greater detail.

Referring additionally to FIG. 9, certain features of dual delay line 342 are further illustrated. Each dual delay line 342 includes a left channel delay line 342a receiving a corresponding frequency component input from DFT stage 336a and right channel delay line 342b receiving a corresponding frequency component input from DFT stage 336b. Delay lines 342a, 342b each include an odd number I of delay stages 344 indexed by i=1, 2, . . . , I. The I number of delayed signal pairs are provided on outputs 345 of delay stages 344 and are correspondingly sent to complex multipliers 346. There is one multiplier 346 corresponding to each delay stage 344 for each delay line 342a, 342b. Multipliers 346 provide equalization weighting for the corresponding outputs of delay stages 344. Each delayed signal pair from corresponding outputs 345 has one member from a delay stage 344 of left delay line 342a and the other member from a delay stage 344 of right delay line 342b. Complex multipliers 346 of each dual delay line 342 output corresponding products of the I number of delayed signal pairs along taps 347. The I number of signal pairs from taps 347 for each dual delay line 342 of operator 340 are input to signal operator 350.

For each dual delay line 342, the I number of pairs of multiplier taps 347 are each input to a different Operation Array (OA) 352 of operator 350. Each pair of taps 347 is provided to a different operation stage 354 within a corresponding operation array 352. In FIG. 9, only a portion of delay stages 344, multipliers 346, and operation stages 354 are shown corresponding to the two stages at either end of delay lines 342a, 342b and the middle stages of delay lines 342a, 342b. The intervening stages follow the pattern of the illustrated stages and are represented by ellipses to preserve clarity.

For an arbitrary frequency $\omega_m$, delay times $\tau_i$ are given by equation (25) as follows:

$$\tau_i = \frac{ITD_{max}}{2} \sin\left(\frac{i-1}{I-1}\pi - \frac{\pi}{2}\right), \quad i = 1, \ldots, I \qquad (25)$$

where, i is the integer delay stage index in the range (i=1, . . . , I); $ITD_{max}$=D/c is the maximum Intermicrophone Time Difference; D is the distance between sensors 22a, 22b; and c is the speed of sound. Further, delay times $\tau_i$ are antisymmetric with respect to the midpoint of the delay stages corresponding to i=(I+1)/2 as indicated in the following equation (26):

$$\tau_{I-i+1} = \qquad (26)$$
$$\frac{ITD_{max}}{2} \sin\left[\frac{(I-i+1)-1}{I-1}\pi - \frac{\pi}{2}\right] = -\frac{ITD_{max}}{2}\sin\left(\frac{i-1}{I-1}\pi - \frac{\pi}{2}\right) = -\tau_i$$

As described in connection with arrangement 110 of FIG. 6, an azimuthal plane can be defined in relation to acoustic sensors 22a and 22b spaced apart by distance D. For arrangement 310, this azimuthal plane is uniformly divided into I sectors with the azimuth position of each resulting sector being given by equation (27) as follows:

$$\theta_i = \frac{i-1}{I-1}180° - 90°, \quad i = 1, \ldots, I. \quad (27)$$

The azimuth positions in auditory space may be mapped to corresponding delayed signal pairs along each dual delay line 342 in accordance with equation (28) as follows:

$$\tau_i = \frac{ITD_{max}}{2}\sin\theta_i, \quad i = 1, \ldots, I \quad (28)$$

Multipliers 346 have been included to multiply each corresponding delay stage 344 by an appropriate one of equalization factors $\alpha_i(m)$; where i is the delay stage index previously described. Preferably, elements $\alpha_i(m)$ are selected to compensate for differences in the noise intensity at sensors 22a, 22b as a function of both azimuth and frequency. In alternative embodiments where these differences can be neglected or are not present, $\alpha_i(m)$ may be set to unity, making multipliers 346 unnecessary.

Figure 10:
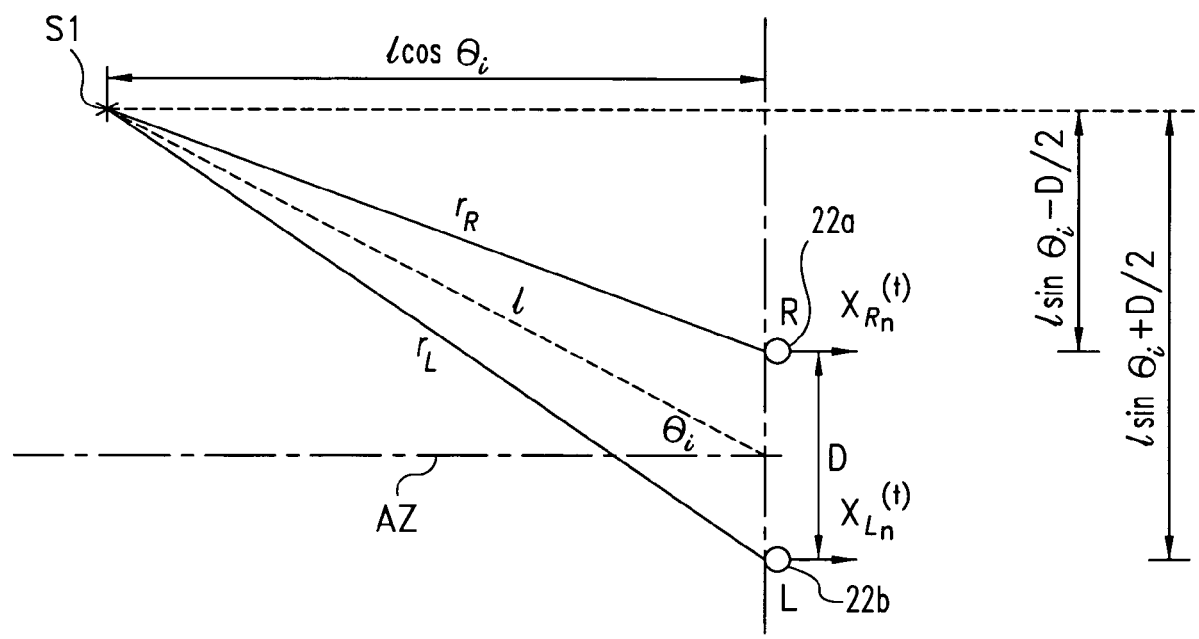
FIG. 10 is a diagram illustrating selected geometric features of the system of FIG. 1 for a representative example of one of a number of acoustic signal sources.

One preferred embodiment for determining equalization factors $\alpha_i(m)$ assumes amplitude compensation is independent of frequency, regarding any departure from this model as being negligible. For this embodiment, the amplitude of the received sound pressure |p| varies with the source-receiver distance r in accordance with equations (A1) and (A2) as follows:

$$|p| \propto \frac{1}{r}, \quad (A1)$$

$$\frac{|p_L|}{|p_R|} = \frac{r_R}{r_L}, \quad (A2)$$

where $|p_L|$ and $|p_R|$ are the amplitude of sound pressures at sensors 22a, 22b. FIG. 10 depicts sensors 22a, 22b and a representative acoustic source S1 within the range of reception to provide input signals $x_{Ln}(t)$ and $x_{Rn}(t)$. According to the geometry illustrated in FIG. 10, the distances $r_L$ and $r_R$, from the source S1 to the left and right sensors, respectively, are given by equations (A3) and (A4), as follows:

$$r_L = \sqrt{(l\sin\theta_i + D/2)^2 + (l\cos\theta_i)^2} = \sqrt{l^2 + lD\sin\theta_i + D^2/4}, \quad (A3)$$

$$r_R = \sqrt{(l\sin\theta_i - D/2)^2 + (l\cos\theta_i)^2} = \sqrt{l^2 - lD\sin\theta_i + D^2/4}. \quad (A4)$$

For a given delayed signal pair in the dual delay-line 342 of FIG. 9 to become equalized under this approach, the factors $\alpha_i(m)$ and $\alpha_{I-i+1}(m)$ must satisfy equation (A5) as follows:

$$|p_L|\alpha_i(m) = |p_R|\alpha_{I-i+1}(m). \quad (A5)$$

Substituting equation (A2) into equation (A5), equation (A6) results as follows:

$$\frac{r_L}{r_R} = \frac{\alpha_i(m)}{\alpha_{I-i+1}(m)}. \quad (A6)$$

By defining the value of $\alpha_i(m)$ in accordance with equation (A7) as follows:

$$\alpha_i(m) = K\sqrt{l^2 + lD\sin\theta_i + D^2/4}, \quad (A7)$$

where, K is in units of inverse length and is chosen to provide a convenient amplitude level, the value of $\alpha_{I-i+1}(m)$ is given by equation (A8) as follows:

$$\alpha_{I-i+1}(m) = K\sqrt{l^2 + lD\sin\theta_{I-i+1} + D^2/4} = K\sqrt{l^2 - lD\sin\theta_i + D^2/4}, \quad (A8)$$

where, the relation $\sin\theta_{I-i+1} = \sin\theta_i$ can be obtained by substituting I-i+1 into i in equation (27). By substituting equations (A7) and (A8) into equation (A6), it may be verified that the values assigned to $\alpha_i(m)$ in equation (A7) satisfy the condition established by equation (A6).

After obtaining the equalization factors $\alpha_i(m)$ in accordance with this embodiment, minor adjustments are preferably made to calibrate for asymmetries in the sensor arrangement and other departures from the ideal case such as those that might result from media absorption of acoustic energy, an acoustic source geometry other than a point source, and dependence of amplitude decline on parameters other than distance.

After equalization by factors $\alpha_i(m)$ with multipliers 346, the in-phase desired signal component is generally the same in the left and right channels of the dual delay lines 342 for the delayed signal pairs corresponding to $i = i_{signal} = s$, and the in-phase noise signal component is generally the same in the left and right channels of the dual delay lines 342 for the delayed signal pairs corresponding to $i = i_{noise} = g$ for the case of a single, predominant interfering noise source. The desired signal at i=s may be expressed as $S_n(m) = A_s \exp[j(\omega_m t + \Phi_s)]$; and the interfering signal at i=g may be expressed as $G_n(m) = A_g \exp[j(\omega_m t + \Phi_g)]$, where $\Phi_s$ and $\Phi_g$ denote initial phases. Based on these models, equalized signals $\alpha_i(m)X_{Ln}^{(i)}(m)$ for the left channel and $\alpha_{I-i+1}(m)X_{Rn}^{(i)}(m)$ for the right channel at any arbitrary point i (except i=s) along dual delay lines 342 may be expressed in equations (29) and (30) as follows:

$$\alpha_i(m)X_{Ln}^{(i)}(m) = A_s \exp j[\omega_m(t+\tau_s-\tau_i)+\Phi_s] + A_g \exp j[\omega_m(t+\tau_g-\tau_i)+\Phi_g], \quad (29)$$

$$\alpha_{I-i+1}(m)X_{Rn}^{(i)}(m) = A_s \exp j[\omega_m(t+\tau_{I-s+1}-\tau_{I-i+1})+\Phi_s] + A_g \exp j[\omega_m(t+\tau_{I-g+1}-\tau_{I-i+1})+\Phi_g]. \quad (30)$$

wherein equations (31) and (32) further define certain terms of equations (29) and (30) as follows:

$$X_{Ln}^{(i)}(m) = X_{Ln}(m) \exp(-2\pi f_m \tau_i) \quad (31)$$

$$X_{Rn}^{(i)}(m) = X_{Rn}(m) \exp(-2\pi f_m \tau_{I-i+1}) \quad (32)$$

Each signal pair $\alpha_i(m)X_{Ln}^{(i)}(m)$ and $\alpha_{I-i+1}(m)X_{Rn}^{(i)}(m)$ is input to a corresponding operation stage 354 of a corresponding one of operation arrays 352 for all m; where each operator array 352 corresponds to a different value of m as in the case of dual delay lines 342. For a given operation array 352, operation stages 354 corresponding to each value of I, except i=s, perform the operation defined by equation (33) as follows:

$$X_n^{(i)}(m) = \frac{\alpha_i(m)X_{Ln}^{(i)}(m) - \alpha_{I-i+1}(m)X_{Rn}^{(i)}(m)}{(\alpha_i/\alpha_s)\exp[j\omega_m(\tau_s - \tau_i)] - (\alpha_{I-i+1}/\alpha_{I-s+1})\exp[j\omega_m(\tau_{I-s+1} - \tau_{I-i+1})]}, \quad \text{for } i \neq s. \quad (33)$$

If the value of the denominator in equation (33) is too small, a small positive constant $\epsilon$ is added to the denominator to limit the magnitude of the output signal $X_n^{(i)}(m)$. No operation is performed by the operation stage 354 on the signal pair corresponding to i=s for all m (all operation arrays 352 of signal operator 350).

With the outputs from operation array 352, the simultaneous localization and identification of the spectral content of the desired signal may be performed with arrangement 310. Localization and extraction with arrangement 310 are further described by the signal flow diagram of FIG. 11 and the following mathematical model. By substituting equations (29) and (30) into equation (33), equation (34) results as follows:

$$X_n^{(i)}(m) = S_n(m) + G_n(m) \cdot v_{s,g}^{(i)}(m), \quad i \neq s \tag{34}$$

where equation (35) further defines:

$$v_{s,g}^{(i)}(m) = \frac{(\alpha_i/\alpha_g)\exp[j\omega_m(\tau_g - \tau_i)] - (\alpha_{l-i+1}/\alpha_{l-g+1})\exp[j\omega_m(\tau_{l-g+1} - \tau_{l-i+1})]}{(\alpha_i/\alpha_s)\exp[j\omega_m(\tau_s - \tau_i)] - (\alpha_{l-i+1}/\alpha_{l-s+1})\exp[j\omega_m(\tau_{l-s+1} - \tau_{l-i+1})]}, \quad i \neq s \tag{35}$$

By applying equation (26) to equation (35), equation (36) results as follows:

$$v_{s,g}^{(i)}(m) = \frac{(\alpha_i/\alpha_g)\exp[j\omega_m(\tau_g - \tau_i)] - (\alpha_{l-i+1}/\alpha_{l-g+1})\exp[-j\omega_m(\tau_g - \tau_{il})]}{(\alpha_i/\alpha_s)\exp[j\omega_m(\tau_s - \tau_i)] - (\alpha_{l-i+1}/\alpha_{l-s+1})\exp[-j\omega_m(\tau_s - \tau_{il})]}, \quad i \neq s. \tag{36}$$

The energy of the signal $X_n^{(i)}(m)$ is expressed in equation (37) as follows:

$$|X_n^{(i)}(m)|^2 = |S_n(m) + G_n(m) \cdot v_{s,g}^{(i)}(m)|^2. \tag{37}$$

A signal vector may be defined:

$$x^{(i)} = (X_1^{(i)}(1), X_1^{(i)}(2), \ldots, X_1^{(i)}(M), X_2^{(i)}(1), \ldots, X_2^{(i)}(M), \ldots, X_N^{(i)}(1), \ldots, X_N^{(i)}(M))^T,$$
$$i=1, \ldots, I,$$

where, T denotes transposition. The energy $\|x^{(i)}\|_2^2$ of the vector $x^{(i)}$ is given by equation (38) as follows:

$$\|x^{(i)}\|_2^2 = \sum_{n=1}^{N}\sum_{m=1}^{M} |X_n^{(i)}(m)|^2 = \sum_{n=1}^{N}\sum_{m=1}^{M} |S_n(m) + G_n(m) \cdot v_{s,g}^{(i)}(m)|^2, \tag{38}$$
$$i=1, \ldots, I.$$

Equation (38) is a double summation over time and frequency that approximates a double integration in a continuous time domain representation.

Further defining the following vectors:

$$s = (S_1(1), S_1(2), \ldots, S_1(M), S_2(1), \ldots, S_2(M), \ldots, S_N(1), \ldots, S_N(M))^T, \text{ and}$$

$$g^{(i)} = (G_1(1)v_{s,g}^{(i)}(1), G_1(2)v_{s,g}^{(i)}(2), \ldots, G_1(M)v_{s,g}^{(i)}(M), G_2(1)v_{s,g}^{(i)}(1), \ldots, G_2(M)v_{s,g}^{(i)}(M), \ldots, G_N(1)v_{s,g}^{(i)}(1), \ldots, G_N(M)v_{s,g}^{(i)}(M))^T, \text{ where}$$
$$i=1, \ldots, I,$$

the energy of vectors s and $g^{(i)}$ are respectively defined by equations (39) and (40) as follows:

$$\|s\|_2^2 = \sum_{n=1}^{N}\sum_{m=1}^{M} |S_n(m)|^2 \tag{39}$$

$$\|g^{(i)}\|_2^2 = \sum_{n=1}^{N}\sum_{m=1}^{M} |G_n(m) \cdot v_{s,g}^{(i)}(m)|^2, \quad i=1, \ldots, I. \tag{40}$$

For a desired signal that is independent of the interfering source, the vectors s and $g^{(i)}$ are orthogonal. In accordance with the Theorem of Pythagoras, equation (41) results as follows:

$$\|x^{(i)}\|_2^2 = \|s + g^{(i)}\|_2^2 = \|s\|_2^2 + \|g^{(i)}\|_2^2, \quad i=1, \ldots, I. \tag{41}$$

Because $\|g^{(i)}\|_2^2 \geq 0$, equation (42) results as follows:

$$\|x^{(i)}\|_2^2 \geq \|s\|_2^2, \quad i=1, \ldots, I. \tag{42}$$

The equality in equation (42) is satisfied only when $\|g^{(i)}\|_2^2 = 0$, which happens if either of the following two conditions are met: (a) $G_n(m)=0$, i.e., the noise source is silent—in which case there is no need for doing localization of the noise source and noise cancellation; and (b) $v_{s,g}^{(i)}(m)=0$; where equation (36) indicates that this second condition arises for $i=g=i_{noise}$. Therefore, $\|x^{(i)}\|_2^2$ has its minimum at $i=g=i_{noise}$, which according to equation (42) is $\|s\|_2^2$. Equation (43) further describes this condition as follows:

$$\|s\|_2^2 = \|x^{(i_{noise})}\|_2^2 = \min_i \|x^{(i)}\|_2^2. \tag{43}$$

Thus, the localization procedure includes finding the position $i_{noise}$ along the operation array 352 for each of the delay lines 342 that produces the minimum value of $\|x^{(i)}\|_2^2$. Once the location $i_{noise}$ along the dual delay line 342 is determined, the azimuth position of the noise source may be determined with equation (27). The estimated noise location $i_{noise}$ may be utilized for noise cancellation or extraction of the desired signal as further described hereinafter. Indeed, operation stages 354 for all m corresponding to $i=i_{noise}$ provide the spectral components of the desired signal as given by equation (44):

$$\acute{S}_n(m) = X_n^{(i_{noise})}(m) = S_n(m) + G_n(m) \cdot v_{s,g}^{(i_{noise})}(m) = S_n(m). \tag{44}$$

Figure 11:
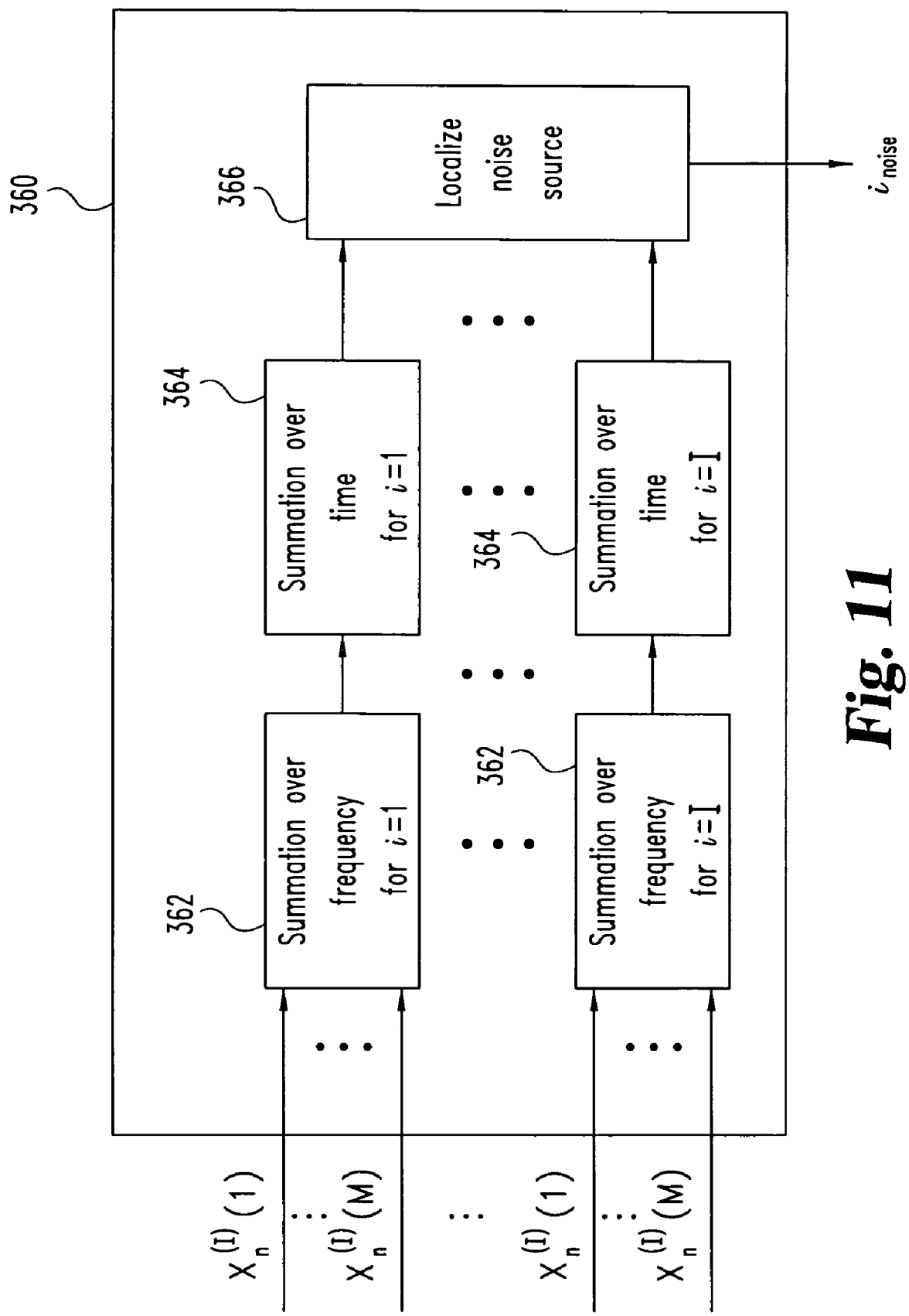
FIG. 11 is a digram illustrating selected aspects of the localization operator of FIG. 8 in greater detail.
Figure 12:
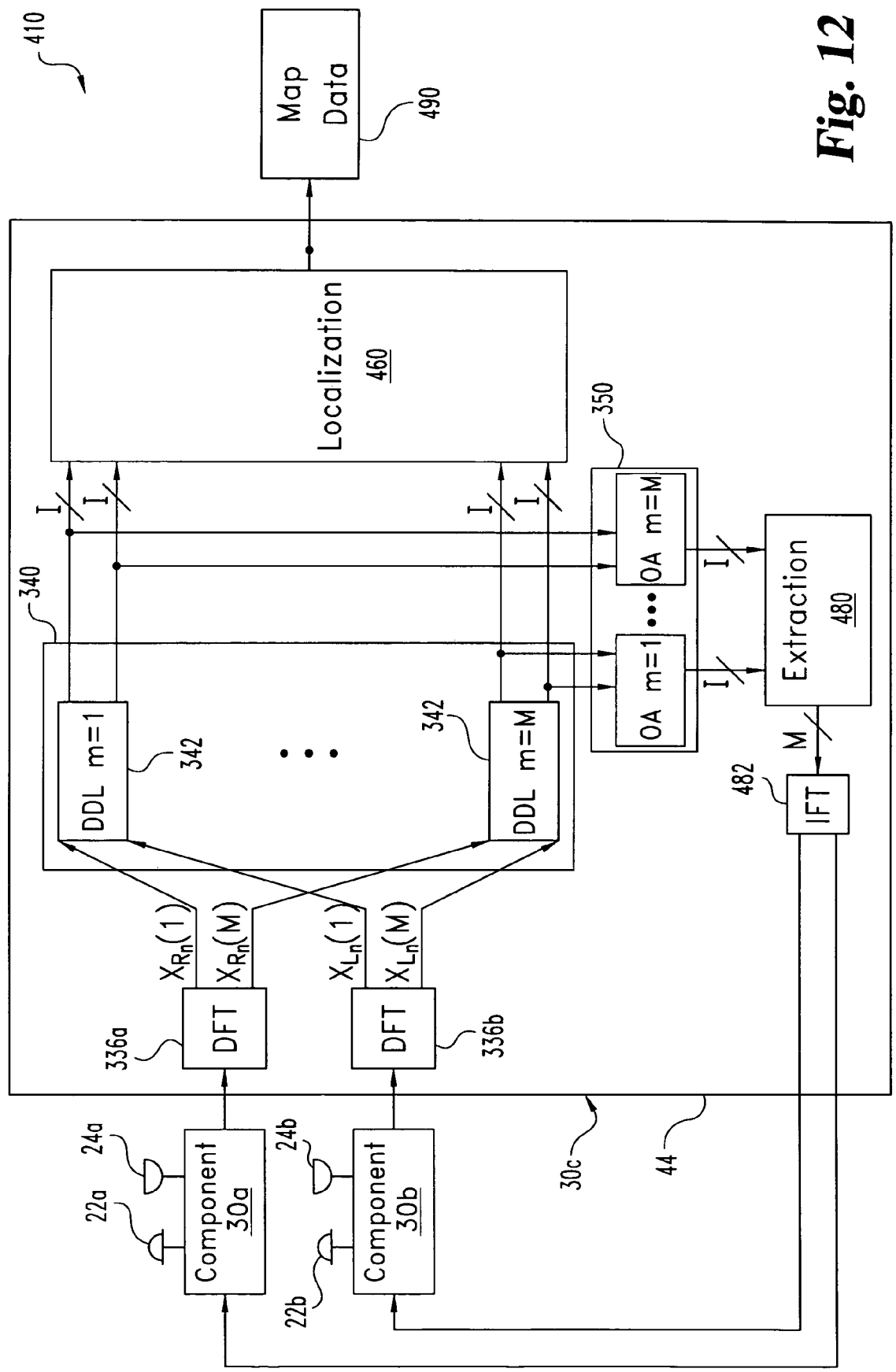
FIG. 12 is a diagram illustrating yet another signal processing arrangement for the system of FIG. 1.

Localization operator 360 embodies the localization technique of arrangement 310. FIG. 11 further depicts operator 360 with coupled pairs of summation operators 362 and 364 for each value of integer index i; where i=1, . . . , I. Collectively, summation operators 362 and 364 perform the operation corresponding to equation (38) to generate $\|x^{(i)}\|_2^2$ for each value of i. For each transform time frame n, the summation operators 362 each receive $X_n^{(i)}(1)$ through $X_n^{(i)}(M)$ inputs from operation stages 354 corresponding to their value of i and sums over frequencies m=1 through m=M. For the illustrated example, the upper summation operator 362 corresponds to i=1 and receives signals $X_n^{(1)}(1)$ through $X_n^{(1)}(M)$ for summation; and the lower summation operator 362 corresponds to i=I and receives signals $X_n^{(I)}(1)$ through $X_n^{(I)}(M)$ for summation.

Each summation operator 364 receives the results for each transform time frame n from the summation operator 362 corresponding to the same value of i and accumulates a sum of the results over time corresponding to n=1 through n=N transform time frames; where N is a quantity of time frames empirically determined to be suitable for localization. For the illustrated example, the upper summation operator 364 corresponds to i=1 and sums the results from the upper summation operator 362 over N samples; and the lower summation operator 364 corresponds to i=I and sums the results from the lower summation operator 362 over N samples.

The I number of values of $\|x^{(i)}\|_2^2$ resulting from the I number of summation operators 364 are received by stage 366. Stage 366 compares the I number of $\|x^{(i)}\|_2^2$ values to determine the value of i corresponding to the minimum $\|x^{(i)}\|_2^2$. This value of i is output by stage 366 as $i=g=i_{noise}$.

Referring back to FIG. 8, post-localization processing by arrangement 310 is further described. When equation (33) is applied to the pair inputs of delay lines 342 at i=g, it corresponds to the position of the off-axis noise source and equation (20) shows it provides an approximation of the desired signal $\acute{S}_n(m)$. To extract signal $\acute{S}_n(m)$, the index value i=g is sent by stage 366 of localization unit 360 to extraction operator 380. In response to g, extraction operator 380 routes the outputs $X_n^{(g)}(1)$ through $X_n^{(g)}(M)=\acute{S}_n(m)$ to Inverse Fourier Transform (IFT) stage 382 operatively coupled thereto. For this purpose, extraction operator 380 preferably includes a multiplexer or matrix switch that has I×M complex inputs and M complex outputs; where a different set of M inputs is routed to the outputs for each different value of the index I in response to the output from stage 366 of localization operator 360.

Stage 382 converts the M spectral components received from extraction unit 380 to transform the spectral approximation of the desired signal, $\acute{S}_n(m)$, from the frequency domain to the time domain as represented by signal $\acute{s}_n(k)$. Signal $\acute{s}_n(k)$ undergoes digital-to-analog conversion with subsystem 44 before transmission to acoustic I/O components 30a, 30b; or with components 30a, 30b after such transmission. Post extraction processing stage 480 processes the extracted output signal to provide separate acoustic output signals to each earphone 24a, 24b. As previously described, these separate signals may be generally the same or different to account for the position of the desired source relative to sensors 22a, 22b.

Another form of expression of equation (33) is given by equation (45) as follows:

$$X_n^{(i)}(m)=w_{Ln}(m)X_{Ln}^{(i)}(m)+w_{Rn}(m)X_{Rn}^{(i)}(m). \quad (45)$$

The terms $w_{Ln}$ and $w_{Rn}$ are equivalent to beamforming weights for the left and right channels, respectively. As a result, the operation of equation (33) may be equivalently modeled as a beamforming procedure that places a null at the location corresponding to the predominant noise source, while steering to the desired output signal $\acute{s}_n(t)$.

Referring to FIGS. 1 and 12–15, signal processing arrangement 410 for system 20 is described; where like reference numerals refer to like features. For arrangement 410, subsystem 44 is configured with appropriate hardware and/or software to include DFT stages 336a, 336b, delay operator 340, and signal operator 350 as described for arrangement 310; and localization operator 460 which is the same as localization operator 360 of arrangement 310 except that equalization factors $\alpha_i(m)$ (i=1, . . . , I) are set to unity for the localization processes associated with localization operator 460. Furthermore, localization operator 460 of arrangement 410 directly receives the output signals of delay operator 340 instead of the output signals of signal operator 350, unlike arrangement 310.

The localization technique embodied in operator 460 begins by establishing two-dimensional (2-D) plots of coincidence loci in terms of frequency versus azimuth position. The coincidence points of each loci represent a minimum difference between the left and right channels for each frequency as indexed by m. This minimum difference may be expressed as the minimum magnitude difference $\delta X_n^{(i)}(m)$ between the frequency domain representations $X_{Lp}^{(i)}(m)$ and $X_{Lp}^{(i)}(m)$, at each discrete frequency m, yielding M/2 potentially different loci. If the acoustic sources are spatially coherent, then these loci will be the same across all frequencies. This operation is described in equations (46)–(49) as follows:

$$i_n(m)=\arg_i \min \{\delta X_n^{(i)}(m)\}, m=1, \ldots, M/2. \quad (46)$$

$$\delta X_n^{(i)}(m)=|X_{Ln}^{(i)}(m)-X_{Rn}^{(i)}(m)|, i=1, \ldots, I;$$
$$m=1, \ldots, M/2, \quad (47)$$

$$X_{Ln}^{(i)}(m)=X_{Ln}(m)exp(-j2\pi\tau_i m/M), i=1, \ldots, I;$$
$$m=1, \ldots, M/2, \quad (48)$$

$$X_{Rn}^{(i)}(m)=X_{Rn}(m)exp(-j2\pi\tau_{I-i+1} m/M), i=1, \ldots, I;$$
$$m=1, \ldots, M/2, \quad (49)$$

If the amplitudes of the left and right channels are generally the same at a given position along dual delay lines 342 of arrangement 410 as indexed by i, then the values of $\delta X_n^{(i)}(m)$ for the corresponding value of i is minimized, if not essentially zero. It is noted that, despite inter-sensor intensity differences, equalization factors $\alpha_i(m)$ (i=1, . . . , I) should be maintained close to unity for the purpose of coincidence detection; otherwise, the minimal $\delta X_n^{(i)}(m)$ will not correspond to the in-phase (coincidence) locations.

Figure 14:
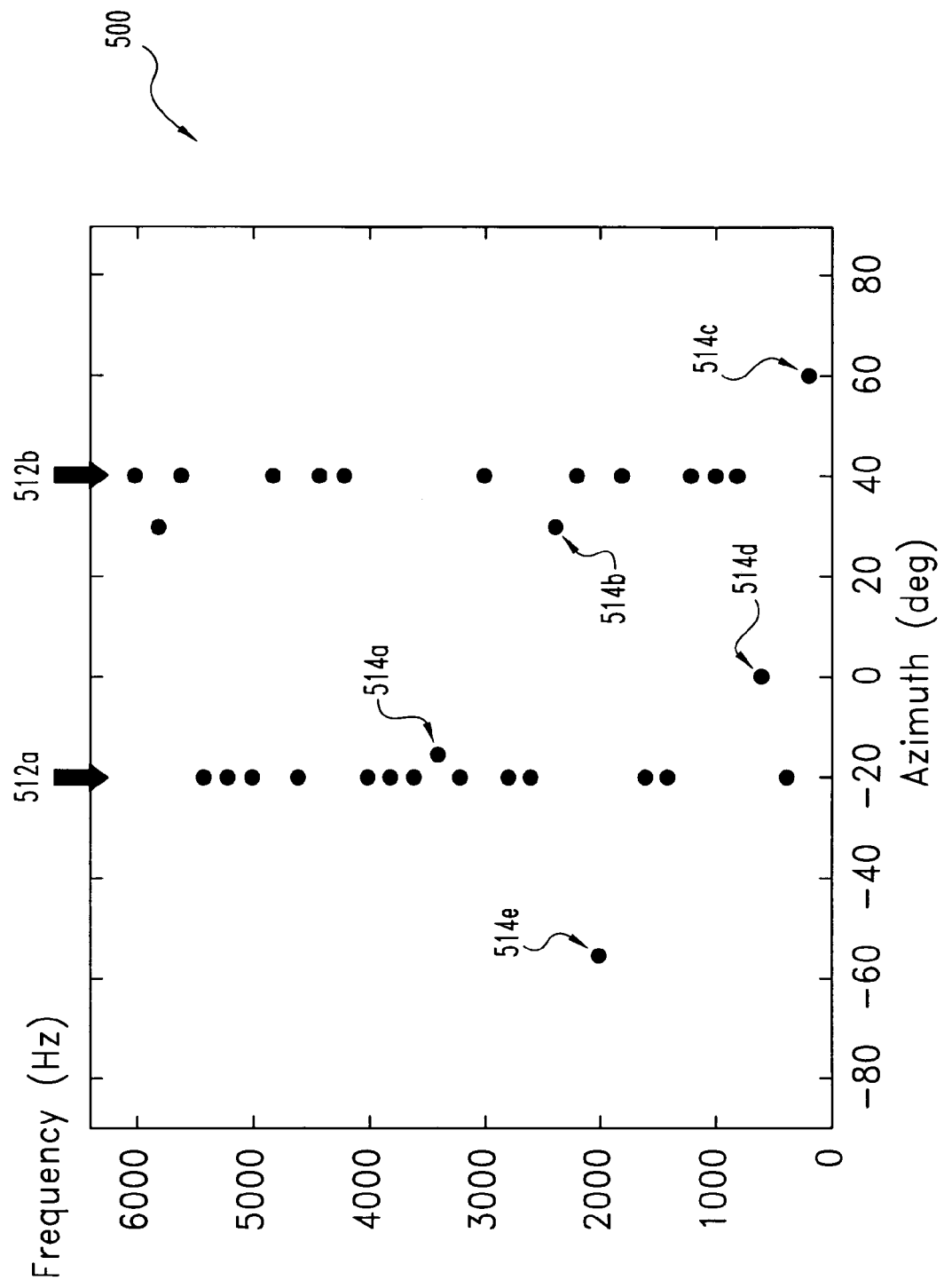
FIG. 14 is a graph illustrating a plot of coincidence loci for two sound sources.

An alternative approach may be based on identifying coincidence loci from the phase difference. For this phase difference approach, the minimum of the phase difference between the left and right channel signals at positions along the dual delay lines 342, as indexed by i, are located as described by the following equations (50) and (51):

$$i_n(m)=\arg_i \min\{\delta X_n^{(i)}(m)\}, m=1, \ldots, M/2, \quad (50)$$

$$\delta X_n^{(i)}(m)=|Im[X_{Ln}^{(i)}(m)X_{Rn}^{(i)}(m)^\dagger]|, i=1, \ldots, I;$$
$$m=1, \ldots, M/2, \quad (51)$$

where, Im[●] denotes the imaginary part of the argument, and the superscript † denotes a complex conjugate. Since the phase difference technique detects the minimum angle between two complex vectors, there is also no need to compensate for the inter-sensor intensity difference. While either the magnitude or phase difference approach may be effective without further processing to localize a single source, multiple sources often emit spectrally overlapping signals that lead to coincidence loci which correspond to nonexistent or phantom sources (e.g., at the midpoint between two equal intensity sources at the same frequency). FIG. 14 illustrates a 2-D coincidence plot 500 in terms of frequency in Hertz (Hz) along the vertical axis and azimuth position in degrees along the horizontal axis. Plot 500 indicates two sources corresponding to the generally vertically aligned locus 512a at about −20 degrees and the vertically aligned locus 512b at about +40 degrees. Plot 500 also includes misidentified or phantom source points 514a, 514b, 514c, 514d, 514e at other azimuths positions that correspond to frequencies where both sources have significant energy. Plots having more than two differently located competing acoustic sources generally result in an even more complex plot.

To reduce the occurrence of phantom information in the 2-D coincidence plot data, localization operator 460 integrates over time and frequency. When the signals are not correlated at each frequency, the mutual interference between the signals can be gradually attenuated by the temporal integration. This approach averages the locations of the coincidences, not the value of the function used to determine the minima, which is equivalent to applying a Kronecker delta function, $\delta(i-i_n(m))$ to $\delta X_n^{(i)}(m)$ and averaging the $\delta(i-i_n(m))$ over time. In turn, the coincidence loci corresponding to the true position of the sources are enhanced. Integration over time applies a forgetting average to the 2-D coincidence plots acquired over a predetermined set of transform time frames from n=1, . . . , N; and is expressed by the summation approximation of equation (52) as follows:

$$P_N(\theta_i, m) = \sum_{n=1}^{N} \beta^{N-n} \delta(i - i_n(m)), \quad i = 1, \ldots, I; m = 1, \ldots, M/2, \quad (52)$$

where, $0<\beta<1$ is a weighting coefficient which exponentially de-emphasizes (or forgets) the effect of previous coincidence results, $\delta(\bullet)$ is the Kronecker delta function, $\theta_i$ represents the position along the dual delay-lines 342 corresponding to spatial azimuth $\theta_i$ [equation (26)], and N refers to the current time frame. To reduce the cluttering effect due to instantaneous interactions of the acoustic sources, the results of equation (52) are tested in accordance with the relationship defined by equation (53) as follows:

$$P_N(\theta_i, m) = \begin{cases} P_N(\theta_i, m), & P_N(\theta_i, m) \geq \Gamma \\ 0, & \text{otherwise.} \end{cases} \quad (53)$$

where $\Gamma \geq 0$, is an empirically determined threshold. While this approach assumes the inter-sensor delays are independent of frequency, it has been found that departures from this assumption may generally be considered negligible. By integrating the coincidence plots across frequency, a more robust and reliable indication of the locations of sources in space is obtained. Integration of $P_n(\theta_i, m)$ over frequency produces a localization pattern which is a function of azimuth. Two techniques to estimate the true position of the acoustic sources may be utilized. The first estimation technique is solely based on the straight vertical traces across frequency that correspond to different azimuths. For this technique, $\theta_d$ denotes the azimuth with which the integration is associated, such that $\theta_d=\theta_i$, and results in the summation over frequency of equation (54) as follows:

$$H_N(\theta_d) = \sum_{m} P_N(\theta_d, m), \quad d = 1, \ldots, I. \quad (54)$$

where, equation (54) approximates integration over time.

The peaks in $H_n(\theta_d)$ represent the source azimuth positions. If there are Q sources, Q peaks in $H_N(\theta_d)$ may generally be expected. When compared with the patterns $\delta(i-i_n(m))$ at each frequency, not only is the accuracy of localization enhanced when more than one sound source is present, but also almost immediate localization of multiple sources for the current frame is possible. Furthermore, although a dominant source usually has a higher peak in $H_N(\theta_d)$ than do weaker sources, the height of a peak in $H_N(\theta_d)$ only indirectly reflects the energy of the sound source. Rather, the height is influenced by several factors such as the energy of the signal component corresponding to $\theta_d$ relative to the energy of the other signal components for each frequency band, the number of frequency bands, and the duration over which the signal is dominant. In fact, each frequency is weighted equally in equation (52). As a result, masking of weaker sources by a dominant source is reduced. In contrast, existing time-domain cross-correlation methods incorporate the signal intensity, more heavily biasing sensitivity to the dominant source.

Notably, the interaural time difference is ambiguous for high frequency sounds where the acoustic wavelengths are less than the separation distance D between sensors 22a, 22b. This ambiguity arises from the occurrence of phase multiples above this intersensor distance related frequency, such that a particular phase difference $\Delta\phi$ cannot be distinguished from $\Delta\phi+2\pi$. As a result, there is not a one-to-one relationship of position versus frequency above a certain frequency. Thus, in addition to the primary vertical trace corresponding to $\theta_d=\theta_i$, there are also secondary relationships that characterize the variation of position with frequency for each ambiguous phase multiple. These secondary relationships are taken into account for the second estimation technique for integrating over frequency. Equation (55) provides a means to determine a predictive coincidence pattern for a given azimuth that accounts for these secondary relationships as follows:

$$\sin\theta_i - \sin\theta_d = \frac{\gamma_{m,d}}{ITD_{\max} f_m}, \quad (55)$$

where the parameter $\gamma_{m,d}$ is an integer, and each value of $\gamma_{m,d}$ defines a contour in the pattern $P_N(\theta_i, m)$. The primary relationship is associated with $\gamma_{m,d}=0$. For a specific $\theta_d$, the range of valid $\gamma_{m,d}$ is given by equation (56) as follows:

$$-ITD_{\max} f_m (1+\sin\theta_d) \leq \gamma_{m,d} \leq ITD_{\max} f_m (1-\sin\theta_d) \quad (56)$$

Figure 15:
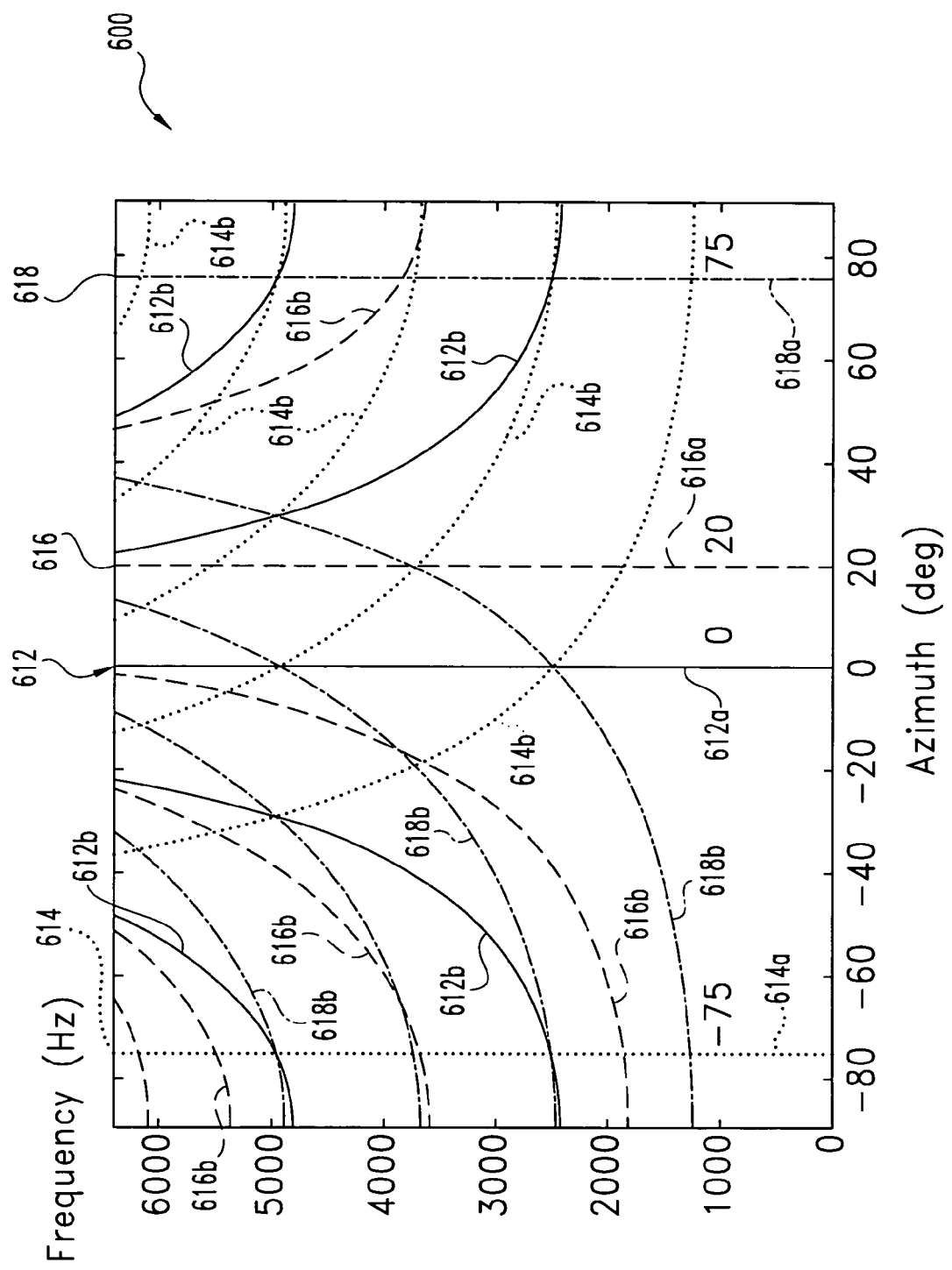
FIG. 15 is a graph illustrating coincidence patterns for azimuth positions corresponding to −75 degrees, 0 degrees, 20 degrees, and 75 degrees.

The graph 600 of FIG. 15 illustrates a number of representative coincidence patterns 612, 614, 616, 618 determined in accordance with equations (55) and (56); where the vertical axis represents frequency in Hz and the horizontal axis represents azimuth position in degrees. Pattern 612 corresponds to the azimuth position of 0°. Pattern 612 has a primary relationship corresponding to the generally straight, solid vertical line 612a and a number of secondary relationships corresponding to curved solid line segments 612b. Similarly, patterns 614, 616, 618 correspond to azimuth positions of −75°, 20°, and 75° and have primary relationships shown as straight vertical lines 614a, 616a, 618a and secondary relationships shown as curved line segments 614b, 616b, 618b, in correspondingly different broken line formats. In general, the vertical lines are designated primary contours and the curved line segments are designated secondary contours. Coincidence patterns for other azimuth positions may be determined with equations (55) and (56) as would occur to those skilled in the art.

Notably, the existence of these ambiguities in $P_N(\theta_i, m)$ may generate artifactual peaks in $H_N(\theta_d)$ after integration along $\theta_d=\theta_i$. Superposition of the curved traces corresponding to several sources may induce a noisier $H_N(\theta_d)$ term. When far away from the peaks of any real sources, the artifact peaks may erroneously indicate the detection of nonexistent sources; however, when close to the peaks corresponding to true sources, they may affect both the detection and localization of peaks of real sources in $H_N(\theta_d)$. When it is desired to reduce the adverse impact of phase ambiguity, localization may take into account the secondary relationships in addition to the primary relationship for each given azimuth position. Thus, a coincidence pattern for each azimuthal direction $\theta_d$ (d=1, . . . , I) of interest may be determined and plotted that may be utilized as a "stencil" window having a shape defined by $P_N(\theta_i,m)$ (i=1, . . . , I; m=1, . . . , M). In other words, each stencil is a predictive pattern of the coincidence points attributable to an acoustic source at the azimuth position of the primary contour, including phantom loci corresponding to other azimuth positions as a factor of frequency. The stencil pattern may be used to filter the data at different values of m.

By employing the equation (56), the integration approximation of equation (54) is modified as reflected in the following equation (57):

$$H_N(\theta_d) = \frac{1}{A(\theta_d)} \sum_m P_N\left[\sin^{-1}\left(\frac{\gamma_{m,d}}{ITD_{max}f_m} + \sin\theta_d\right), m\right], \quad d = 1, \ldots, I, \quad (57)$$

where $A(\theta_d)$ denotes the number of points involved in the summation. Notably, equation (54) is a special case of equation (57) corresponding to $\gamma_{m,d}=0$. Thus, equation (57) is used in place of equation (54) when the second technique of integration over frequency is desired. As shown in equation (26), both variables $\theta_i$ and $\tau_i$ are equivalent and represent the position in the dual delay-line. The difference between these variables is that $\theta_i$ indicates location along the dual delay-line by using its corresponding spatial azimuth, whereas $\tau_i$ denotes location by using the corresponding time-delay unit of value $\tau_i$. Therefore, the stencil pattern becomes much simpler if the stencil filter function is expressed with $\tau_i$ as defined in the following equation (58):

$$\tau_i - \tau_d = \frac{\gamma_{m,d}}{2f_m}, \quad (58)$$

where, $\tau_d$ relates to $\theta_d$ through equation (28). For a specific $\tau_d$, the range of valid $\gamma_{m,d}$ is given by equation (59) as follows:

$-(ITD_{max}/2+\tau_d)f_m \leq \gamma_{m,d} \leq (ITD_{max}/2-\tau_d)f_m$, $\gamma_{m,d}$ is an integer. (59)

Changing value of $\tau_d$ only shifts the coincidence pattern (or stencil pattern) along the $\tau_i$-axis without changing its shape. The approach characterized by equations (58) and (59) may be utilized as an alternative to separate patterns for each azimuth position of interest; however, because the scaling of the delay units $\tau_i$ is uniform along the dual delay-line, azimuthal partitioning by the dual delay-line is not uniform, with the regions close to the median plane having higher azimuthal resolution. On the other hand, in order to obtain an equivalent resolution in azimuth, using a uniform $\tau_i$ would require a much larger I of delay units than using a uniform $\theta_i$.

Figure 13:
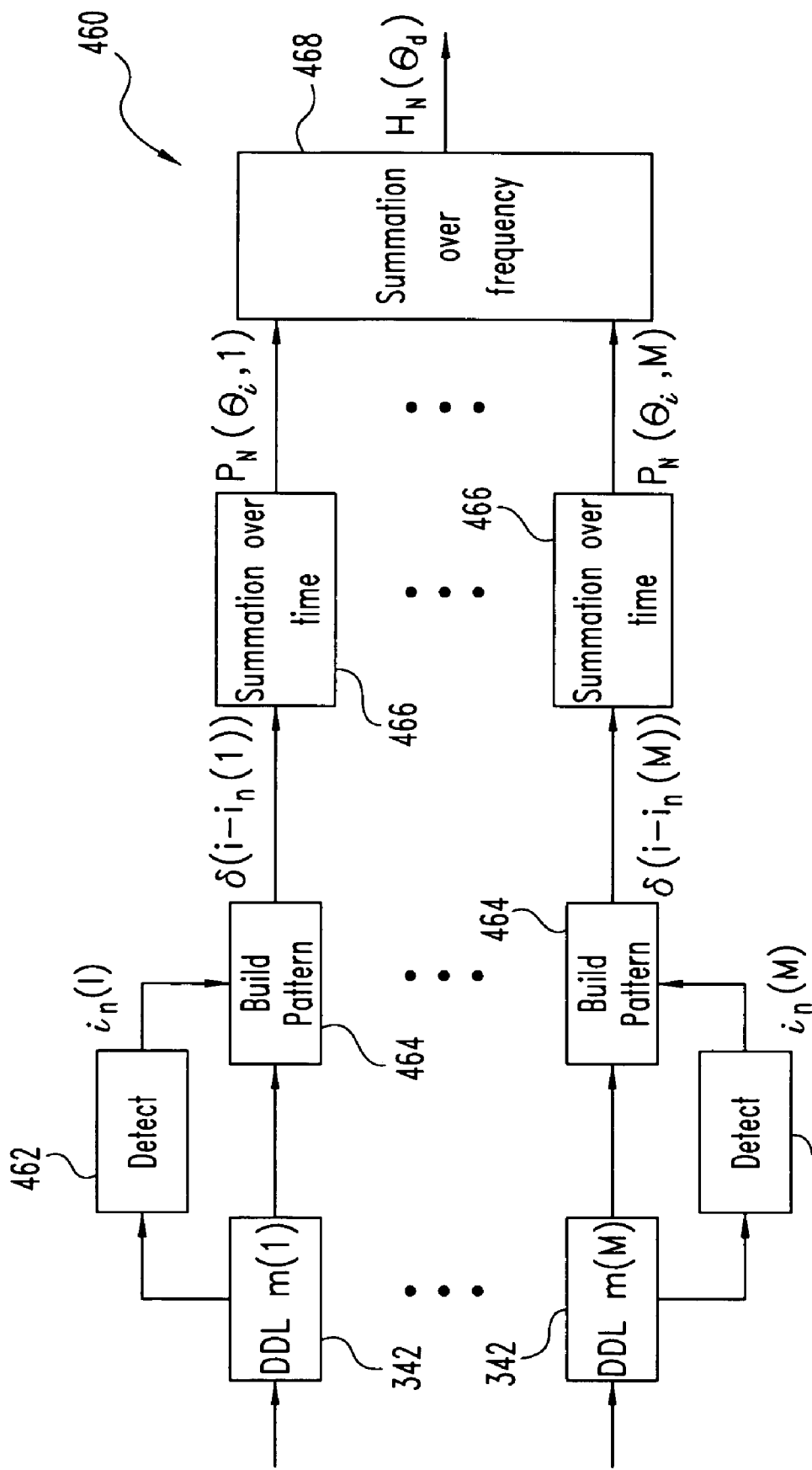
FIG. 13 is a signal flow diagram illustrating selected aspects of the localization operator of FIG. 12 in greater detail.

The signal flow diagram of FIG. 13 further illustrates selected details concerning localization operator 460. With equalization factors $\alpha_i(m)$ set to unity, the delayed signal of pairs of delay stages 344 are sent to coincidence detection operators 462 for each frequency indexed to m to determine the coincidence points. Detection operators 462 determine the minima in accordance with equation (46) or (50). Each coincidence detection operator 462 sends the results $i_n(m)$ to a corresponding pattern generator 464 for the given m. Generators 464 build a 2-D coincidence plot for each frequency indexed to m and pass the results to a corresponding summation operator 466 to perform the operation expressed in equation (52) for that given frequency. Summation operators 466 approximate integration over time. In FIG. 13, only operators 462, 464, and 466 corresponding to m=1 and m=M are illustrated to preserve clarity, with those corresponding to m=2 through m=M−1 being represented by ellipses.

Summation operators 466 pass results to summation operator 468 to approximate integration over frequency. Operators 468 may be configured in accordance with equation (54) if artifacts resulting from the secondary relationships at high frequencies are not present or may be ignored. Alternatively, stencil filtering with predictive coincidence patterns that include the secondary relationships may be performed by applying equation (57) with summation operator 468.

Referring back to FIG. 12, operator 468 outputs $H_N(\theta_d)$ to map data block 490, which corresponds to acoustic source positional information. With the map data of block 490, acoustic sources can be localized and tracked dynamically as they move in space. Movement trajectories may be estimated from the sets of locations $\delta(i-i_n(m))$ computed at each sample window n.

The localization techniques of localization operator 460 are particularly suited to localize more than two acoustic sources of comparable sound pressure levels and frequency ranges, and need not specify an on-axis desired source. As such, the localization techniques of arrangement 410 provide independent capabilities to localize and map more than two acoustic sources relative to a number of positions as defined with respect to sensors 22a, 22b. However, in other embodiments, the localization capability of localization operator 460 may also be utilized in conjunction with a designated reference source to perform extraction and noise suppression. Indeed, extraction operator 480 of the illustrated embodiment incorporates such features as more fully described hereinafter.

It has been discovered that by suppressing one or more different frequency components in each of a plurality of interfering sources after localization, it is possible to reduce the interference from the noise sources in complex acoustic environments, such as in the case of multi-talkers, in spite of the temporal and frequency overlaps between talkers. Although a given frequency component or set of components may only be suppressed in one of the interfering sources for a given time frame, the dynamic allocation of suppression of each of the frequencies among the localized interfering acoustic sources generally results in better intelligibility of the desired signal than is possible by simply nulling only the most offensive source at all frequencies.

Extraction operator 480 provides one implementation of this approach by utilizing localization information from localization operator 460 to identify Q interfering noise sources corresponding to positions other than i=s. The positions of the Q noise sources are represented by i=noise1, noise2, . . . , noiseQ. Notably, operator 480 receives the outputs of signal operator 350 as described in connection with arrangement 310, that presents corresponding signals $X_n^{(i=noise1)}(m)$, $X_n^{(i=noise2)}(m)$, ..., $X_n^{(i=noiseQ)}(m)$ for each frequency m. These signals include a component of the desired signal at frequency m as well as components from sources other than the one to be canceled. For the purpose of extraction and suppression, the equalization factors $\alpha_i(m)$ need not be set to unity once localization has taken place. To determine which frequency component or set of components to suppress in a particular noise source, the amplitudes of $X_n^{(i=noise1)}(m)$, $X_n^{(i=noise2)}(m)$, ..., $X_n^{(i=noiseQ)}(m)$ are calculated and compared. The minimum $X_n^{(inoise)}(m)$, is taken as output $\acute{S}_n(m)$ as defined by the following equation (60):

$$\acute{S}_n(m) = X_n^{(inoise)}(m), \quad (60)$$

where, $X_n^{(inoise)}(m)$ satisfies the condition expressed by equation (61) as follows:

$$|X_n^{(inoise)}(m)| = \min\{|X_n^{(i=noise1)}(m)|, |X_n^{(i=noise2)}(m)|, \ldots, |X_n^{(i=noiseQ)}(m)|, |\alpha_s(m) X_{Ln}^{(s)}(m)|\}; \quad (61)$$

for each value of m. It should be noted that, in equation (61), the original signal $\alpha_s(m) X_{Ln}^{(s)}(m)$ is included. The resulting beam pattern may at times amplify other less intense noise sources. When the amount of noise amplification is larger than the amount of cancellation of the most intense noise source, further conditions may be included in operator 480 to prevent changing the input signal for that frequency at that moment.

Many other embodiments of the present invention are envisioned. For example, any of arrangements 110, 310, 410 can be utilized for processing performed with system 20*a* or 20*b*. In another example, the signal processor 42 and memory 50 of arrangement 110 is utilized in part or in whole to implement features of processing arrangements 310 or 410.

Another embodiment includes operating a hearing aid including a first component and a second component, where the first component includes a pair of conductors. The first and second components are placed in contact with skin in a spaced apart relationship. The first pair of conductors are each electrically coupled to the skin through this placement. An electric potential is generated between the conductors to transmit an electrical communication signal from the first component to the skin in contact therewith. This signal is received by the second component over an electrical transmission pathway along the skin between the two components.

Yet another embodiment includes: operating a hearing aid including a first component and a second component, where the first component includes a first pair of electrodes and the second component includes a second pair of electrodes; electrically engaging the first pair of electrodes and the second pair of electrodes with skin; and transmitting an electrical signal from the first component to the second component by electrical conduction along the skin between the first pair of electrodes and the second pair of electrodes during this engagement.

In still another embodiment, a hearing aid is provided that includes first and second components, where the first component includes an acoustic sensor. The first and second components contact skin, and an electrical signal is transmitted from the first component to the second component during this contact by electrical conduction along a pathway formed by the skin between the first and second components.

A further embodiment includes a system comprising a hearing aid to enhance hearing of a user. This hearing aid includes a first component for placement in contact with the skin of the user. The first component includes a first pair of electrodes to electrically couple to the skin and a transmission circuit operable to transmit electrical signals to the skin through the first pair of electrodes. A second component is also included in the hearing aid that is spaced apart from the first component. This second component is sized for placement in a passageway of an ear of the user. The second component includes a receiver circuit. This receiver circuit receives the electrical signals by electrical conduction along the skin from the first component. The second component also includes an output device responsive to the electrical signals to stimulate hearing of the user.

Yet a further embodiment includes: detecting acoustic excitation with a number of acoustic sensors that provide a number of sensor signals; establishing a set of frequency components for each of the sensor signals; and determining an output signal representative of the acoustic excitation from a designated direction. This determination includes weighting the set of frequency components for each of the sensor signals to reduce variance of the output signal and provide a predefined gain of the acoustic excitation from the designated direction.

In another embodiment, a hearing aid includes a number of acoustic sensors in the presence of multiple acoustic sources that provide a corresponding number of sensor signals. A selected one of the acoustic sources is monitored. An output signal representative of the selected one of the acoustic sources is generated. This output signal is a weighted combination of the sensor signals that is calculated to minimize variance of the output signal.

Another embodiment includes: operating a voice input device including a number of acoustic sensors that provide a corresponding number of sensor signals; determining a set of frequency components for each of the sensor signals; and generating an output signal representative of acoustic excitation from a designated direction. This output signal is a weighted combination of the set of frequency components for each of the sensor signals calculated to minimize variance of the output signal.

Still a further embodiment includes an acoustic sensor array operable to detect acoustic excitation that includes two or more acoustic sensors each operable to provide a respective one of a number of sensor signals. Also included is a processor to determine a set of frequency components for each of the sensor signals and generate an output signal representative of the acoustic excitation from a designated direction. This output signal is calculated from a weighted combination of the set of frequency components for each of the sensor signals to reduce variance of the output signal subject to a gain constraint for the acoustic excitation from the designated direction.

In another embodiment, a signal processing system localizes and extracts acoustic excitation from a selected one of a number of acoustic sources. The system includes two spaced apart sensors to detect the sources and a processing subsystem with a delay line. The system can be provided in the form of two or more modules that communicate with each other using skin as a transmission medium. Alternatively or additionally, this embodiment may include filtering based on coincidence loci.

A further embodiment includes a processing system comprised of two or more modules that use skin as a communication medium. For this embodiment, a first signal is provided from a first acoustic sensor and a second signal from a second acoustic sensor spaced apart from the first acoustic sensor. The first and second signals each correspond to a composite of two or more acoustic sources that, in turn, include a plurality of interfering sources and a desired source. The interfering sources are localized by processing of the first and second signals to provide a corresponding number of interfering source signals. These signals each include a number of frequency components. One or more of the frequency components are suppressed for each of the interfering source signals.

EXPERIMENTAL SECTION

The present invention will be further described with reference to the following specific examples. These experiments and results are intended to be illustrative of the present invention and should not be considered limiting or restrictive with regard to the scope of the present invention.

Experiments have been conducted using both analog FM signals and FSK digital communication techniques. In the analog FM test, a transmitter included a DSP56002 board from Motorola with a digital signal processor (DSP). The transmitter also included a direct digital synthesizer (DDS) modulator (AD7008) coupled to the board. The DDS provided a carrier frequency modulation (range: 1 Hz to 25 MHz) with a signal of frequency $\leqq 18$ kHz. The system was tested in the range of 50 kHz to 5 MHz. Signal-to-noise ratio (SNR) measurements relative to the noise floor indicated that preferred frequency ranges (60 dB) were 1.0–2.0 and 3.5–5.0 MHz, with a dip to 50 dB in the 2.0–3.5 MHz range. Low impedance HP 40493D foam Ag/AgCl electrodes with an area of 0.4 of a square inch were used to provide electrode pairs for most FM tests. The measurements above were taken at a transmit/receive separation of 7 cm. The signal was attenuated by 2–3 dB for each additional 20 cm of transmission length across the skin. No difference was noted between trials on one person in which the electrode were placed on the same arm relative to the case where the pairs were placed behind the two ears. Tests were also performed with custom electrodes (Easy-Flow 45 welding strips: Ag/Cu/Zn/Cd; 1.3 square inches) for which there was a loss of 3 dB; however signals could still be suitably sent from one ear to the other.

FSK testing used the DSP56002 board and the DDS for a transmitter, which was adjusted to provide modulated transmission signals in an FSK format. The DDS mapped the symbols to be transmitted into deviation frequencies off the center frequency. A center frequency of 5 MHz was used with deviation frequencies of 10, 13, 16, and 19 kHz. The transmitted signal was then sent to a receiver via skin transmission. The receiver comprised an RF/IF mixer coupled to a waveform generator. The waveform generator provided a 5 MHz signal that was used to demodulate the received signal, bringing it down to the kilohertz range. The mixer was coupled to DSP56302 processing board, which detected the mixed signals. A sampling rate of 48 kHz was used and 32 samples per symbol were acquired. Both cosine and sine wave matched filters, one pair of each target frequency (e.g., 10, 13, 16 and 19 kHz), were applied to the samples and the outputs were squared and summed to derive measures of signal strength at each frequency. The largest value was assumed to correspond to the frequency—and hence the code—which had been transmitted.

For the FSK testing, two pairs of electrodes (HP 40493D; connected to the transmitter and receiver, respectively) were placed upon different body parts (e.g., hands, neck and ear). Testing showed that the receiver still correctly identified symbols over a long transmission distance, e.g., from the hand to ear lobe. Testing was also performed to detect possible bit errors that may emanate from transmission through the skin. A 128 length input stream of 0's and 1's was sent over a direct connection and across the skin from the wrist to the ear lobe. There were no bit errors in this test. The results of these tests show that transmission of signals across the skin is feasible and reliable.

During the experiments, the current measured across the skin was in the range of 3–4 µA. This is well below the "Safe Current Limits for Electrical Apparatus" set by the American National Standards Institute (ANSI), i.e., 1 mA (rms) for frequencies of $\geqq 1$ MHz, and 1–2 order below the range that can pose danger for heart defibrillation. Furthermore, experiments have been conducted using a dielectric between the electrode pairs and skin; where the electrical coupling is capacitive. This indirect coupling technique has been found acceptable for transmission frequencies in the range of 100 MHz to 1.5 GHz.

All publications, patents, and patent applications cited in this specification are herein incorporated by reference as if each individual publication, patent, or patent application were specifically and individually indicated to be incorporated by reference and set forth in its entirety herein. Further, any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only selected embodiments have been shown and described and that all changes, modifications and equivalents that come within the spirit of the invention as defined by the following claims are desired to be protected.

What is claimed is:

1. A method, comprising:
   operating a hearing aid including a first component and a second component, the first component including a first pair of conductors;
   placing the first component and the second component in contact with a skin surface in a spaced apart relationship, the first pair of conductors each being electrically coupled to the skin surface by said placing;
   generating an electric potential between the first pair of conductors to transmit a first electrical communication signal from the first component to the skin in contact with the first component; and
   receiving the first electrical communication signal with the second component over an electrical transmission pathway along the skin between the first component and second component.

2. The method of claim 1, wherein the first pair of conductors are each capacitively coupled to the skin surface by a dielectric positioned therebetween.

3. The method of claim 1, further comprising disposing the second component in a passage of an ear of a user of the hearing aid and positioning the first component outside the ear.

4. The method of claim 3, wherein the second component is a cochlear implant.

5. The method of claim 3, wherein the first component includes a sensor to detect an acoustic excitation and one or more of the first component and the second component includes a signal processor.

6. The method of claim 4, wherein the second component includes a plurality of conductors electrically coupled to the skin of the user to receive the electric communication signal and further comprising transmitting a second electrical communication signal from the second component to the first component by electrical conduction through the portion of the skin between the first component and the second component.

7. The method of claim 1, wherein the electric communication signal is a modulated, time varying waveform.

8. The method of claim 1, wherein said placing includes mounting the first component to a first ear of a user and the second component to a second ear of the user.

9. A method, comprising:
operating a hearing aid including a first component and a second component, the first component including a first pair of electrodes and the second component including a second pair of electrodes;
electrically engaging the first pair of electrodes and the second pair of electrodes with skin; and
transmitting an electrical signal from the first component to the second component by electrical conduction along the skin between the first pair of electrodes and the second pair of electrodes during said engaging.

10. The method of claim 9, wherein said electrically engaging is performed by capacitively coupling the first pair of electrodes to the skin with a dielectric positioned therebetween.

11. The method of claim 9, wherein the first pair of electrodes and the second pair of electrodes establish an electrical conduction circuit including the skin.

12. The method of claim 9, wherein the hearing aid further includes a third component having a third pair of electrodes electrically engaged with the skin to communicate with at least one of the first component and the second component by electric conduction through the skin positioned therebetween, the third component including an acoustic sensor.

13. The method of claim 12, wherein the first component includes a signal processor and the second component includes an output device to stimulate hearing of a user of the hearing aid, and further comprising:
positioning the second component in a passageway of an ear of the user;
receiving an input signal from the third component corresponding to an acoustic excitation;
processing the input signal with the signal processor to generate the electrical signal; and
providing an output signal to the ear of the user with the output device.

14. The method of claim 9, wherein said electrically engaging includes positioning the first component relative to a first ear of a user and the second component relative to a second ear of the user.

15. A method, comprising:
providing a hearing aid including a first component and a second component, the first component including an acoustic sensor;
contacting skin with the first component and the second component; and
transmitting an electrical signal from the first component to the second component during said contacting by electrical conduction along a pathway formed by the skin between the first component and second component.

16. The method of claim 15, wherein the hearing aid comprises a third component including another acoustic sensor, the third component is spaced apart from the first component and the second component and is in communication with the second component by electrical conduction along the skin between the third component and the second component, and the first component and the third component are operable to provide a binaural input to the second component.

17. The method of claim 16, wherein the second component includes a signal processor to process the binaural input.

18. The method of claim 17, wherein the hearing aid further includes a fourth component positioned in a passage of an ear of a user of the hearing aid, the fourth component being in communication with the second component to provide an output signal to stimulate hearing perception of the user.

19. The method of claim 18, wherein the fourth component is a cochlear implant.

20. The method of claim 15, wherein said contacting including engaging a first ear of a user with the first component and a second ear of the user with the second component.

21. A system comprising: a hearing aid to enhance hearing of a user, the hearing aid including:
a first component operable for placement in contact with skin of the user, the first component including a first pair of electrodes operable to be electrically coupled to the skin and a transmitter circuit operable to transmit electrical signals to the skin through said first pair of electrodes; and
a second component spaced apart from said first component, said second component being sized for placement in a passageway of an ear of the user, the second component including a receiver circuit to receive said electrical signals by electric conduction along the skin from said first component and an output device responsive to said electrical signals to stimulate hearing of the user.

22. The system of claim 21, wherein the second component includes a second pair of electrodes operable to electrically couple with the skin of the user to receive said electric signals.

23. The system of claim 21, wherein the second component is in the form of a cochlear implant.

24. The system of claim 21, wherein the first component includes an acoustic sensor.

25. The system of claim 21, wherein at least one of the first component and the second component includes a signal processor.

26. The system of claim 21, further comprising means for receiving an acoustic input.

27. The system of claim 26, further comprising means for processing the acoustic input.

28. The system of claim 27, wherein said receiving means includes at least two acoustic sensors configured to be spaced apart from one another.

29. The system of claim 27, wherein said first component includes a dielectric layer at least partially covering said first pair of electrodes.

30. A method, comprising:
operating a hearing aid including a first component and a second component, the first component including a first pair of electrodes and the second component including a second pair of electrodes;
placing the first component to electrically couple the first pair of electrodes to skin of a first ear of a user;
placing the second component to electrically couple the second pair of electrodes to skin of a second ear of the user;

generating an electric potential between the first pair of electrodes to transmit a first electrical communication signal from the first component through the skin of the first ear of the user; and receiving the first electrical communication signal through the skin of the second ear with the second component over a transmission pathway between the first component and second component.

31. The method of claim 30, wherein the first pair of electrodes are each capacitively coupled to the skin of the first ear by a dielectric positioned therebetween.

32. The method of claim 30, wherein the hearing aid includes a third component carried with the user.

33. The method of claim 32, which includes wirelessly communicating between the third component and at least one of the first component and the second component.

34. The method of claim 33, wherein the first component is a cochlear implant.

35. The method of claim 30, wherein the first component includes a sensor to detect an acoustic excitation and one or more of the first component and the second component includes a signal processor.

36. A hearing aid system comprising:
a first hearing aid component including a first pair of electrodes, a first acoustic sensor to detect sound, and circuitry coupled to the first acoustic sensor and the first pair of electrodes, the first component being sized and shaped to be carried behind an ear of the user while electrically coupling the first pair of electrodes to a first region of skin of the user, the circuitry being operable to generate and transmit one or more electrical signals representative of the sound detected with the first acoustic sensor through the user when the first pair of electrodes are electrically coupled to the first region; and a second component including a second pair of electrodes, the second component being sized and shaped to be carried by the user while electrically coupling the second pair of electrodes to a second region of the skin of the user, the second region being spaced apart from the first region, the second component being operable to wirelessly communicate through the user while the second pair of electrodes are electrically coupled to the second region.

37. The system of claim 36, wherein the second component is a behind-the-ear unit.

38. The system of claim 37, wherein said second component further includes a second acoustic sensor.

39. The system of claim 38, further comprising means for processing signals from the first acoustic sensor and the second acoustic sensor.

40. The system of claim 36, further comprising a cochlear implant.

* * * * *